(12) United States Patent
Kittaka et al.

(10) Patent No.: US 7,421,176 B2
(45) Date of Patent: *Sep. 2, 2008

(54) WAVEGUIDE ELEMENT USING PHOTONIC CRYSTAL

(75) Inventors: Shigeo Kittaka, Osaka (JP); Kazuaki Oya, Osaka (JP); Keiji Tsunetomo, Osaka (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/547,828

(22) PCT Filed: Mar. 4, 2004

(86) PCT No.: PCT/JP2004/002719

§ 371 (c)(1), (2), (4) Date: Sep. 2, 2005

(87) PCT Pub. No.: WO2004/081625

PCT Pub. Date: Sep. 23, 2004

(65) Prior Publication Data

US 2007/0058915 A1 Mar. 15, 2007

(30) Foreign Application Priority Data

Mar. 4, 2003 (JP) .............................. 2003-056550

(51) Int. Cl.
*G02B 6/10* (2006.01)
(52) U.S. Cl. ....................................... 385/129; 385/132
(58) Field of Classification Search .......... 385/129–132
See application file for complete search history.

(56) References Cited

U.S. PATENT DOCUMENTS

| 6,134,043 | A | 10/2000 | Johnson et al. | 359/237 |
| 6,433,919 | B1 * | 8/2002 | Chowdhury et al. | 359/332 |
| 6,597,721 | B1 * | 7/2003 | Hutchinson et al. | 372/98 |
| 6,795,621 | B2 * | 9/2004 | Tokushima | 385/50 |
| 6,813,399 | B2 * | 11/2004 | Hamada | 385/11 |
| 6,901,194 | B2 * | 5/2005 | Charlton et al. | 385/122 |
| 6,937,781 | B2 * | 8/2005 | Shirane et al. | 385/16 |
| 2002/0027655 | A1 | 3/2002 | Kittaka et al. | 356/256 |
| 2002/0060847 | A1 | 5/2002 | Joannopoulos et al. | 359/584 |
| 2003/0142385 | A1 | 7/2003 | Kittaka et al. | 359/279 |

(Continued)

FOREIGN PATENT DOCUMENTS

EP 1 039 561 9/2000

(Continued)

OTHER PUBLICATIONS

Ohashi, et al., "Latest Technological Trend of Communication Optical Fiber", O Plus E, vol. 23, No. 9, pp. 1061-1066, 2001 (w/partial translation).

(Continued)

*Primary Examiner*—Kevin S Wood
(74) *Attorney, Agent, or Firm*—Hamre, Schumann, Mueller & Larson, P.C.

(57) ABSTRACT

A waveguide element using a photonic crystal having a refractive index periodicity in one direction is provided with an input portion causing propagation light due to a band on a Brillouin zone boundary within the photonic crystal.

17 Claims, 28 Drawing Sheets

U.S. PATENT DOCUMENTS

| | | | |
|---|---|---|---|
| 2003/0184845 A1 | 10/2003 | Kittaka et al. | 359/321 |
| 2004/0008437 A1 | 1/2004 | Kittaka et al. | 359/883 |

FOREIGN PATENT DOCUMENTS

| | | |
|---|---|---|
| EP | 1 211 531 | 6/2002 |
| EP | 1248123 | 10/2002 |
| JP | 2001-51244 | 2/2001 |
| JP | 2002-236206 | 8/2002 |
| JP | 2003-215362 | 7/2003 |
| JP | 2003-287633 | 10/2003 |
| WO | 03/079071 | 9/2003 |

OTHER PUBLICATIONS

Knight, et al., "New regimes for fiber optics using photonic crystal fiber", Optical Society of America Annual Meeting 2002, Conference Program, WA 3, p. 94, 2002.

Joannopoulos, et al., "Computing Photonic Band Structures", Photonic Crystals, Princeton University Press, 1995.

Plihal, et al., "Photonic band structure of two-dimensional systems: The triangular lattice", Physical Review B, vol. 44, No. 16, p. 8565, 1991.

Fink, et al., "Multilayered photonic bandgap fibers for high-power laser applications", Photonics West, Technical Summary Digest, C4993-04, p. 383, 2003.

Optical Fiber Communication 2002, Technical Digest, ThK4, p. 468-469.

Shoten, et al., Microoptics Handbook, p. 224 (w/partial translation).

Kittaka, et al., "Simulations of wave propagation in one-dimensional photonic crystals", The Japan Society of Applied Physics, 2a-ZN-1, p. 949, 2003 (w/partial translation).

Yeh, P., et al., "Electromagnetic propagation in periodic stratified media. I. General theory", *Optical Society of America*, vol. 67, No. 4, pp. 423-438 (1977).

* cited by examiner

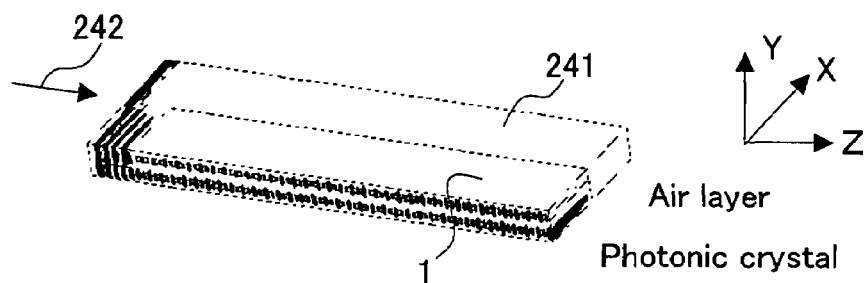
FIG. 25A
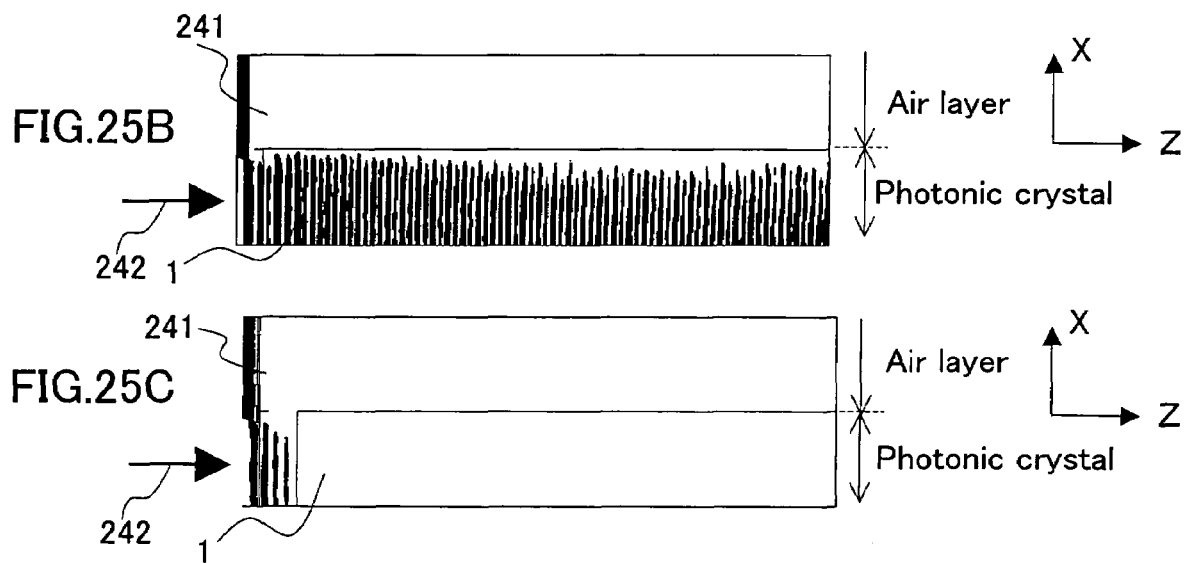
FIG. 25B
FIG. 25C

WAVEGUIDE ELEMENT USING PHOTONIC CRYSTAL

TECHNICAL FIELD

The present invention relates to waveguide elements controlling the propagation of electromagnetic waves, and in particular to waveguide elements using one-dimensional photonic crystals.

BACKGROUND ART

Photonic crystals have a structure in which dielectric materials with differing refractive indices are arranged with a periodicity that is close to the wavelength of light, and it is well known that they have the characterizing features of (a) confining light by a photonic band gap;
(b) very large wavelength dispersion due to their special band structure; and
(c) group velocity anomalies of the propagated light.

Many optical devices that take advantage of these features have been proposed or are being studied.

The inventors of the present invention have studied the propagation of electromagnetic waves in one-dimensional and two-dimensional photonic crystals without periodicity in the propagation direction. Details are disclosed in JP 2002-236206A, for example. When a plane wave is coupled as the incident light to an end surface of a photonic crystal without periodicity in the propagation direction of the incident light, propagation light due to a plurality of photonic bands is generated, depending on the frequency of the incident light. Among these, propagation light waves due to bands that are not of the lowest order (in the following referred to as "higher-order band propagation light") have the above-mentioned characteristics of "very large wavelength dispersion" and "group velocity anormalies", so that they can be applied to various kinds of optical devices.

However, a portion of the energy of the incident light always is propagated as propagation light due to the lowest-order band (in the following referred to as "first band propagation light"). This first-band propagation light hardly displays the above-mentioned effects of "very large wavelength dispersion" and "group velocity anormalies" at all. Therefore, if the higher order band propagation light is utilized, this first-band propagation light merely will be loss. That is to say, the first-order propagation light not only considerably decreases the utilization efficiency of the incident-light energy of the device, but becomes also a cause of lowering the S/N ratio of the device due to stray light.

Now, research of the inventors has shown that propagation light within the photonic crystal that is due to a single higher order band propagation light can be obtained by coupling into the photonic crystal incident light that has been phase modulated at the same period as the end surface of the photonic crystal. Thus, the efficiency of various kinds of optical devices exploiting such features as wavelength dispersion or group velocity anomalies can be increased dramatically. The phase modulation of the incident light can be realized by a simple method, such as passing a plane wave through a phase grating, for example.

The electric field of a higher order band propagation light wave within a photonic crystal without periodicity in the propagation direction is split into two regions by two nodes within one period of the refractive index periodicity of the photonic crystal. There is also the characteristic that the phase of the propagation light within the various regions of the photonic crystal is shifted by half a period. In order to attain such a propagation light, the phase grating for phase modulation of the incident light has the same period in the same direction as the period of the photonic crystal.

Now, the period of the refractive index of the photonic crystal is shorter than the wavelength of ordinary light, so that also the period of the phase grating becomes shorter than the wavelength of the light, which leads to difficulties in the manufacturing process. For example, a method of cutting a portion of the photonic crystal away by forming grooves in it and splitting the photonic crystal into a waveguide portion and a phase grating portion is conceivable, but it is technically difficult to form narrow grooves having a high aspect ratio with high precision.

Moreover, in order to decrease the proportion of first band propagation light and increase the proportion of higher order band propagation light, the proportion between the zero-order diffraction light intensity and the ±1-order diffraction light intensity due to the phase grating as well as the phase needs to be adjusted, so that optimization design is required.

DISCLOSURE OF INVENTION

In view of these problems of the conventional technology, it is an object of the present invention to provide a waveguide element using a photonic crystal that can exploit the peculiar functionality of photonic crystals and that can be manufactured easily.

In accordance with the present invention, a waveguide element using a photonic crystal having a refractive index periodicity in one direction includes an input portion causing propagation light due to a band on a Brillouin zone boundary within the photonic crystal.

BRIEF DESCRIPTION OF DRAWINGS

FIG. 25A shows the intensity distribution of the electric field of the cross section in the middle of a waveguide portion.

FIG. 25B shows the electric field intensity distribution in the middle of a high refractive index layer.

FIG. 25C shows the electric field intensity distribution in the middle of a low refractive index layer.

DESCRIPTION OF THE INVENTION

Figure 1:
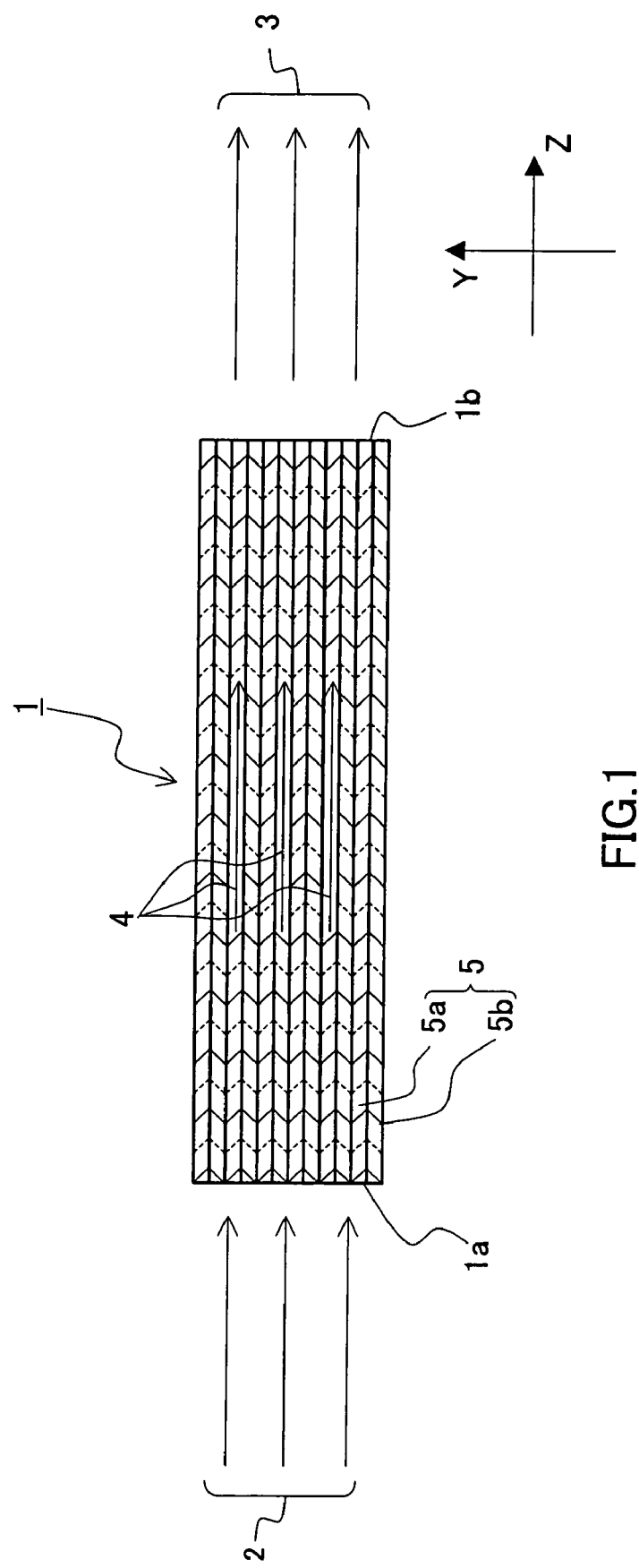
FIG. 1 is a cross-sectional view showing the propagation of electromagnetic waves in a photonic crystal having a refractive index periodicity in one direction.

A waveguide element using a photonic crystal according to an embodiment of the present invention can utilize propagation due to a band on a Brillouin zone boundary in a photonic band structure. At the Brillouin zone boundary, similar properties to electromagnetic wave propagation with a higher-order band are attained even with the lowest-order band, so that utilization as an electromagnetic wave controlling element is possible. Therefore, it can be applied widely as an element utilizing, for example, dispersion compensation or increased non-linear optical effects caused by group velocity anomalies of the higher-order band propagation light.

It is preferable that the input portion lets at least one electromagnetic wave of substantially plane wave shape be incident to an end face of the photonic crystal, which is substantially parallel to the direction of the refractive index period, the incidence being at an incident angle θ with respect to the end face; and that the incident angle θ satisfies the relationship $$n \cdot \sin \theta \cdot (a/\lambda_0) = \pm 0.5$$

where n is the refractive index of a medium contacting the end face of the photonic crystal, $\lambda_0$ is the vacuum wavelength of the electromagnetic wave, and a is the photonic crystal's period. Thus, it is possible to realize propagation due to a band on the Brillouin zone boundary in the photonic crystal. Therefore, it can be applied widely as an element utilizing, for example, dispersion compensation or increased non-linear optical effects caused by group velocity anomalies of the higher-order band propagation light.

It is also preferable that the input portion includes an incident-side phase modulation portion that is arranged in close proximity to or in contact with an end face of the photonic crystal, the end face being substantially parallel to the direction of the refractive index periodicity, the incident-side phase modulation portion phase-modulating an electromagnetic wave of substantially plane wave shape and letting the electromagnetic wave be incident to the end face of the photonic crystal; and an incidence portion that lets the electromagnetic wave be incident on the incident-side phase modulation portion. Thus, it is possible to realize propagation due to a band on the Brillouin zone boundary in the photonic crystal. Therefore, it can be applied widely as an element utilizing, for example, dispersion compensation or increased non-linear optical effects caused by group velocity anomalies of the higher-order band propagation light.

It is also preferable that the incident-side phase modulation portion is a phase grating having a refractive index period that has the same direction as the direction of the refractive index period of the photonic crystal, and that is an integer multiple of the refractive index period of the photonic crystal. Thus, it is possible to realize propagation due to a band on the Brillouin zone boundary in the photonic crystal. Therefore, it can be applied widely as an element utilizing, for example, dispersion compensation or increased non-linear optical effects caused by group velocity anomalies of the higher-order band propagation light.

It is also preferable that the incident-side phase modulation portion is a phase grating having a refractive index period that has the same direction as the direction of the refractive index period of the photonic crystal, and that is twice the refractive index period of the photonic crystal; and that the incidence portion lets the electromagnetic wave be incident on the phase grating in a direction that is substantially perpendicular to the direction of the refractive index period of the phase grating. Therefore, it can be applied widely as an element utilizing, for example, dispersion compensation caused by group velocity anomalies of the higher-order band propagation light or increased non-linear optical effects. Thus, it is possible to realize a waveguide element utilizing higher-order band propagation light in a photonic crystal.

It is also preferable that the incident-side phase modulation portion is a phase grating having a refractive index period that has the same direction as the direction of the refractive index period of the photonic crystal, and that is twice the refractive index period of the photonic crystal; that the incidence portion lets the electromagnetic wave be incident on the phase grating in such a manner that the electromagnetic wave is on a plane including the direction of the refractive index period of the phase grating and a direction perpendicular to the direction of the refractive index period of the phase grating, and is incident at an angle θ to the direction perpendicular to the direction of the refractive index period; and that the angle θ satisfies the relationship $$n \cdot \sin \theta \cdot (a/\lambda_0) = +0.5$$

where n is the refractive index of a medium adjacent to an incidence end face of the phase grating, $\lambda_0$ is the wavelength of the electromagnetic wave in vacuum, and a is the period of the photonic crystal. Thus, the period of the phase grating becomes twice the photonic crystal period, so that fabrication becomes easier. Moreover, the phase grating should make the intensity of the ±1-diffraction wave as large as possible, so that the optimization design is simplified.

It is also preferable that the incident-side phase modulation portion is a phase grating having a refractive index period that has the same direction as the direction of the refractive index period of the photonic crystal, and that is the same as the refractive index period of the photonic crystal; that the incidence portion lets the electromagnetic wave be incident on the phase grating in such a manner that the electromagnetic wave is on a plane including the direction of the refractive index period of the phase grating and a direction perpendicular to the direction of the refractive index period of the phase grating, and is incident at an angle θ to the direction perpendicular to the direction of the refractive index period; and that the angle θ satisfies the relationship $$n \cdot \sin \theta \cdot (a/\lambda_0) = \pm 0.5$$

where n is the refractive index of a medium adjacent to an incidence end face of the phase grating, $\lambda_0$ is the wavelength of the electromagnetic wave in vacuum, and a is the period of the photonic crystal. Thus, it is possible to realize a waveguide element utilizing higher-order band propagation light within the photonic crystal. Therefore, it can be applied widely as an element utilizing, for example, dispersion compensation or increased non-linear optical effects caused by group velocity anomalies of the higher-order band propagation light.

It is also preferable that the incident-side phase modulation portion is formed in one piece with the photonic crystal. Thus, it can be fabricated easily.

It is also preferable that the waveguide element further includes a confinement portion that confines an electromagnetic wave propagating through the photonic crystal in a direction that is perpendicular to the direction of the refractive index period of the photonic crystal such that this electromagnetic wave propagating through the photonic crystal dose not leak in the direction of the refractive index period of the photonic crystal. Thus, guided light does not leak out, and a waveguide element with low loss can be realized.

The confinement portion may be a reflective layer that is arranged on at least one of the side faces of the photonic crystal that are perpendicular to the direction of the refractive index period of the photonic crystal.

The confinement portion also may be a photonic crystal that is arranged on at least one of the side faces of the photonic crystal that are perpendicular to the direction of the refractive index period of the photonic crystal, and that has a refractive index period in the same direction as the refractive index period of the photonic crystal.

It is also preferable that the waveguide element further includes an emission-side phase modulation portion that is arranged in close proximity or adjacent to an end face that is opposite to the end face of the photonic crystal at which the incident-side phase modulation portion is arranged. Thus, it is possible to emit a plane wave.

Furthermore, the emission-side phase modulation portion may be a phase grating having a refractive index periodicity that has the same direction as the refractive index period of the photonic crystal.

It is also preferable that the emission-side phase modulation portion is a phase grating having a refractive index period that has the same direction as the refractive index period of the photonic crystal, and that is the same as the refractive index period of the photonic crystal, the emission-side phase modulation portion being formed in one piece with the photonic crystal. Thus, it can be fabricated easily.

Furthermore, the emission-side phase modulation portion may have the same refractive index period structure as the incident-side phase modulation portion.

Furthermore, the emission-side phase modulation portion may be arranged such that the directions of its incident end and emission end are opposite to those of the incident-side phase modulation portion.

Furthermore, it is preferable that the electromagnetic waves propagating through the photonic crystal are waves belonging to either one or both of a lowest-order photonic band and the second photonic band from the low-order side. Thus, it is possible to apply the waveguide element broadly as an element utilizing dispersion compensation or increased non-linear optical effects caused by group velocity anomalies or the like.

The following is a more detailed explanation of embodiments of the present invention, with reference to the accompanying drawings.

FIG. 1 is a cross-sectional view showing the propagation of electromagnetic waves in a photonic crystal 1 having a refractive index periodicity in a given direction. In FIG. 1, the propagation direction of the electromagnetic wave is taken to be the Z-axis direction, and the direction perpendicular to the propagation direction of the electromagnetic wave is taken to be the Y-axis direction. The photonic crystal 1 is a one-dimensional photonic crystal having a refractive index periodicity only in the Y-axis direction. A material 5a and a material 5b are alternately layered in the Y-axis direction, forming a multi-layer structure 5. The thickness of the material 5a is $t_A$, and its refractive index is $n_A$. The thickness of the material 5b is $t_B$, and its refractive index is $n_B$. The photonic crystal 1 is a multi-layer structure 5 with a period a, in which the material 5a and the material 5b are layered in alternation. The period a is $(t_A+t_B)$.

In FIG. 1, the photonic crystal 1 is the core and the air (not shown in the drawing) around the photonic crystal 1 serves as the cladding, thus constituting an optical waveguide. When a plane wave with a vacuum wavelength of $\lambda_0$ is coupled as incident light 2 from an end face 1a serving as the incident end of the photonic crystal 1, this wave is propagated as propagation light 4 within the photonic crystal 1. The propagation light 4 is emitted as emission light 3 from the end face 1b, which is the emission end face on the side opposite to the incident face. By calculating and plotting the photonic bands, it can be determined how this propagation light 4 is propagated within the multi-layered film of the material 5a and the material 5b within the photonic crystal 1. A method for the band calculation is described in detail for example in "Photonic Crystals", Princeton University Press (1995) and in Physical Review B vol. 44, No. 16 p. 8565, 1991, for example.

For the band calculation, it is assumed that the photonic crystal 1 in FIG. 1 has a periodic structure that continues infinitely in the Y-direction (the layering direction) and extends infinitely in the X- and the Z-direction (direction of the plane of the layers). The following is an explanation of FIGS. 2, 3A and 3B, but since these figures relate to the photonic crystal of FIG. 1, the explanation is given with reference to FIG. 1.

Figure 2:
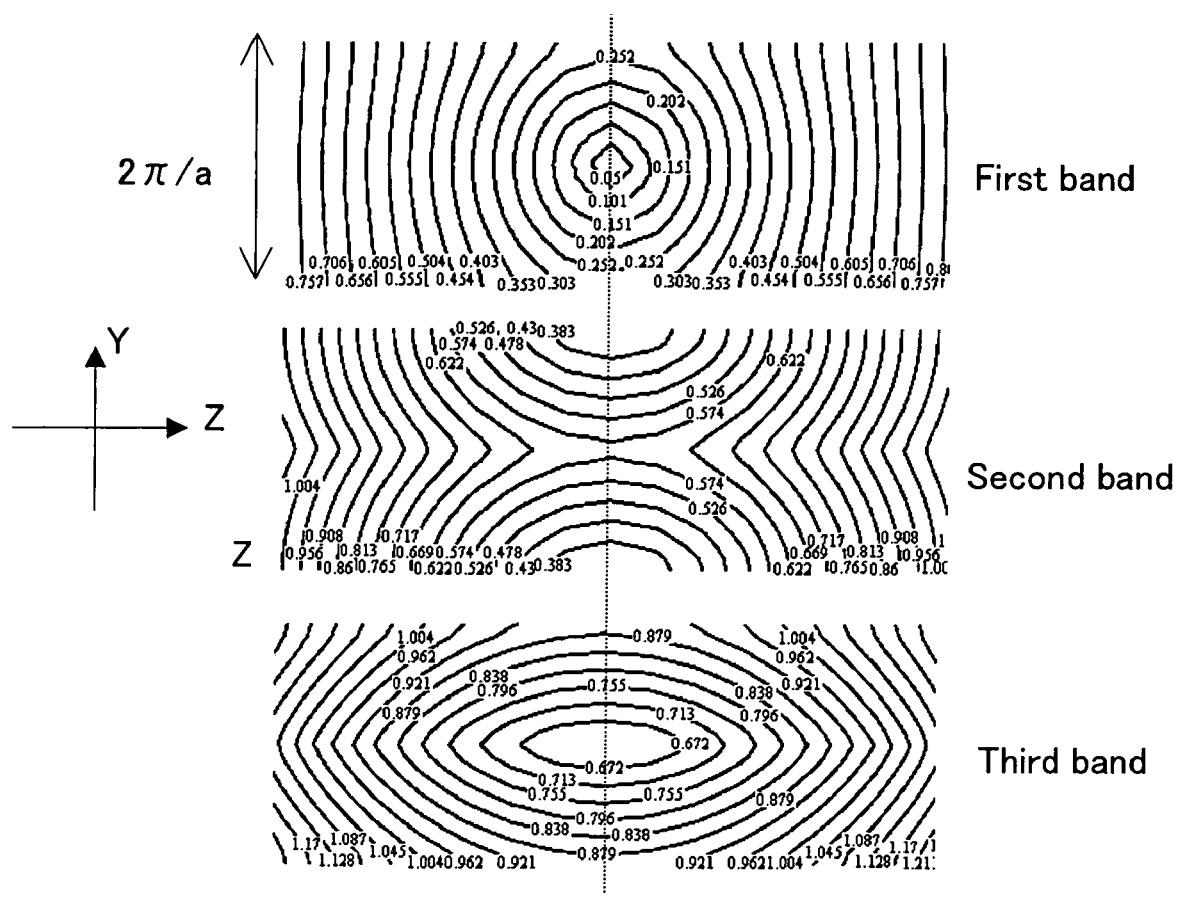
FIG. 2 is a band diagram of the photonic crystal shown in FIG. 1.

FIG. 2 is a band diagram of the photonic crystal 1 shown in FIG. 1. As for the parameters of this photonic crystal 1, the refractive index $n_A$ of the material 5a is 2.1011 and in terms of the period a, its thickness $t_A$ is $t_A=0.3$ a. The refractive index $n_B$ of the material 5b is 1.4578 and in terms of the period a, its thickness $t_B$ is $t_B=0.7$ a. FIG. 2 shows the result of a band calculation in the Y-axis direction and the Z-axis direction for the photonic crystal 1 having a multi-layer structure with the period a with the material 1a and the material 1b layered in alternation. It should be noted that FIG. 2 shows the region within the first Brillouin zone for the first, second and third bands of TE polarized light. In FIG. 2, the points at which the value of the normalized frequency $\omega a/2\pi c$ is the same are connected, so that they are shown as contour lines. It should be noted that these contour lines also are referred to as lines of equal frequency below. The numbers marking these lines indicate the value of the normalized frequency $\omega a/2\pi c$. It should be noted that the normalized frequency $\omega a/2\pi c$ is expressed using the angular frequency of the incident light 2, the period a of the structure, and the speed of light c in a vacuum. Moreover the normalized frequency also can be expressed by $a/\lambda_0$, using the wavelength $\lambda_0$ of the incident light 2 in a vacuum. In the following, the normalized frequency is given as $a/\lambda_0$ for simplicity.

In FIG. 2, the width in Y-axis direction of the Brillouin zone is $2\pi/a$, but since there is no periodicity in the Z-axis direction, the Brillouin zone has no boundary in the lateral direction and extends infinitely. It should be noted that "TE polarized light" refers to polarized light whose electric field points in the X-axis direction. Also, band diagrams of TM polarized light, which is polarized light whose magnetic field points in the X-axis direction, are similar to band diagrams of TE polarized light, but have a somewhat different shape.

The following is a discussion of the propagation light 4 within the photonic crystal 1 corresponding to a plane wave (incident light 2) that is incident on the end face 1a of the photonic crystal 1.

Figure 3A:
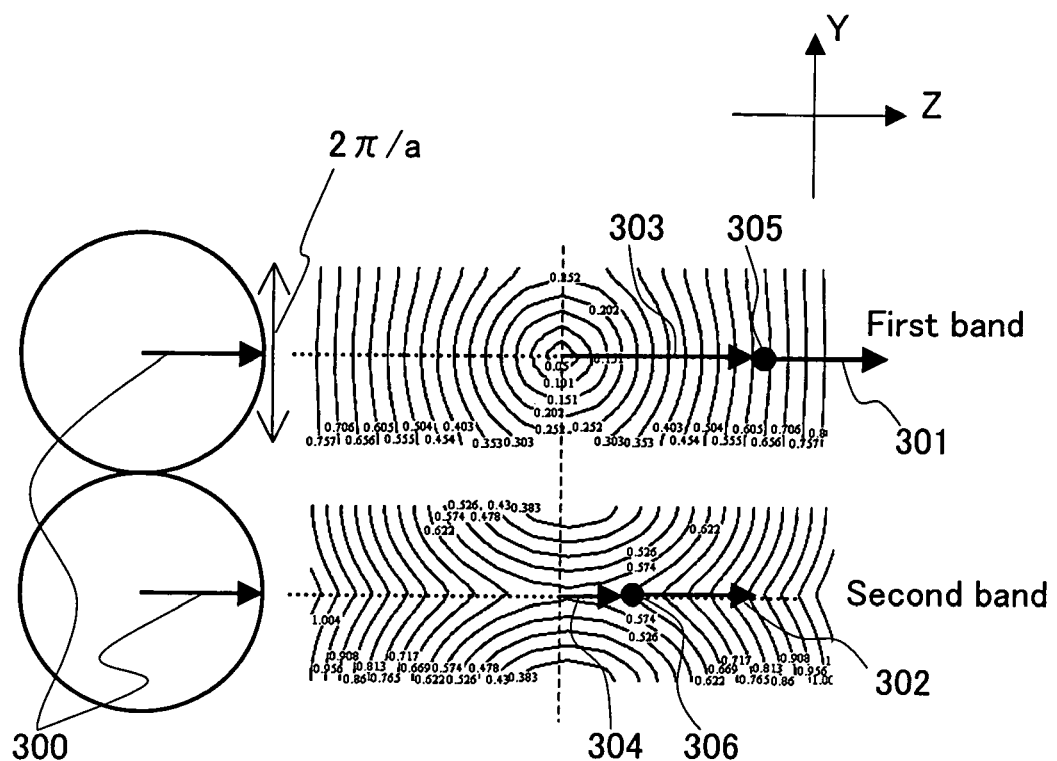
FIG. 3A is a band diagram also including the incident light that is incident onto the photonic crystal shown in FIG. 1.

FIG. 3A is a band diagram also including the incident light that is incident onto the photonic crystal 1 shown in FIG. 1.

More specifically, it is a band diagram for the case that a plane wave (TE polarized light) with the specific frequency of $a/\lambda_0$ is incident in the Z-axis direction from the end face 1a of the photonic crystal 1 in FIG. 1. It should be noted that the end face 1a is perpendicular to the Z-axis. The refractive index of the medium contacting this end face 1a is taken to be n. In the case of FIG. 1, this medium may be for example air, which is a homogeneous medium with a uniform refractive index.

In FIG. 3A, the right side is a band diagram of the situation within the photonic crystal 1, whereas the left side is a band diagram of the homogeneous medium (air) outside the photonic crystal 1. In FIG. 3A, the upper half shows the coupling between the incident light and the first band, whereas the lower half shows the coupling between the incident light and the second band. In FIG. 1, the incident light 2 is incident to air onto the end face 1a, so that the band diagram of the incident light 2 is the band diagram for air.

The band diagram of a homogeneous medium is a sphere (a circle in the YZ-plane) whose radius r can be expressed by the following equation:

$r=n\cdot(a/\lambda_0)\cdot(2\pi/a)$

It should be noted that $(2\pi/a)$ on the right side of the above equation is a factor for adaptation to the band diagrams of photonic crystals.

Thus, it is possible to determine the coupled bands on the side of the photonic crystal 1 by means of graphical construction.

In FIG. 3A, there are correspondence points 305 and 306 at which the normalized frequency $a/\lambda_0$ matches the incident light in the first and the second bands, so that waves corresponding to the respective bands are propagated within the photonic crystal 1. Also, in FIG. 3A, the direction and the period of the wavefront of the incident light are expressed by the inverse of the orientation and size of the arrow 300, which is the wave vector, and the wavefront direction and the period of the propagated light are expressed by the arrow 303 (first band) and the arrow 304 (second band), which are also wave vectors. Furthermore, the direction in which the wave energy of the propagation light advances is the direction normal to the lines of equal frequency, and is expressed by the arrows 301 and 302. Thus, the propagation light in all bands advances in the Z-axis direction.

Figure 3B:
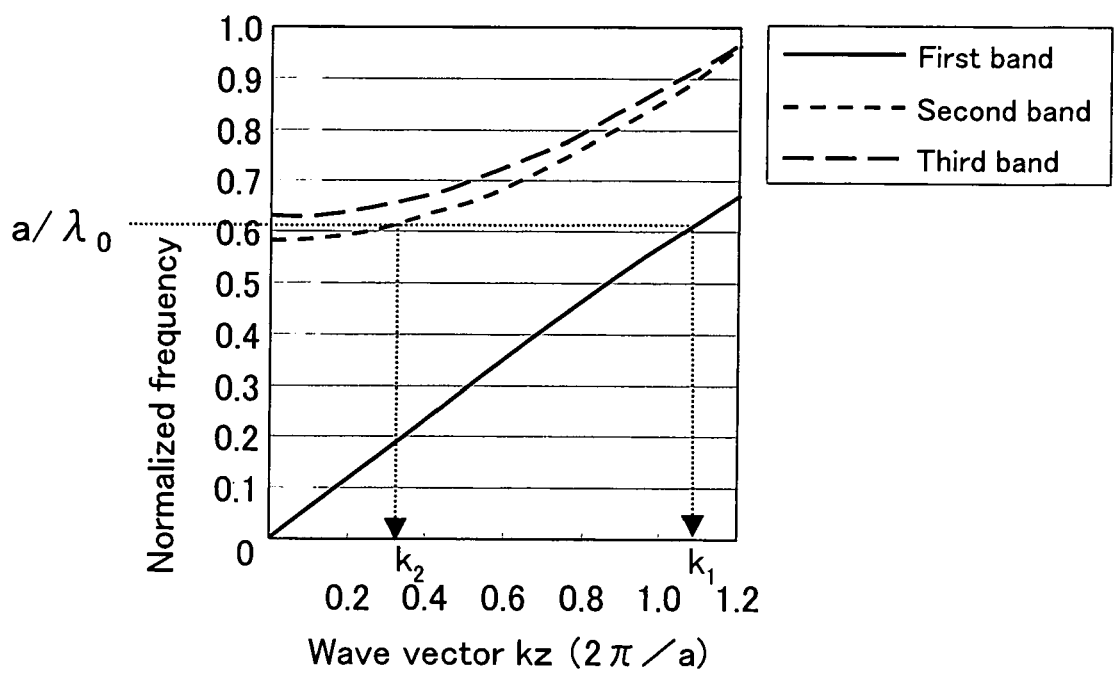
FIG. 3B is a diagram in which the band diagram of FIG. 3A is shown only with respect to the Z-axis direction.

FIG. 3B is a diagram in which the band diagram of FIG. 3A is shown only with respect to the Z-axis direction. As shown in FIG. 3B, if the vacuum wavelength of the incident light 2 is $\lambda_0$, then there are wave vectors $k_1$ and $k_2$ that correspond to each band, within the photonic crystal 1. In other words, the propagation light 4 is propagated in the Z-axis direction within the photonic crystal as a wave with the wavelength $\lambda_1=2\pi/k_1$ and the wavelength $\lambda_2=2\pi/k_2$ (see FIG. 1).

Here, the value obtained by dividing the vacuum wavelength $\lambda_0$ of the light by the wavelength for the case of propagation through the photonic crystal 1 (such as $\lambda_1$, $\lambda_2$ etc.) is defined as the "effective refractive index". As can be seen from FIG. 3B, the normalized frequency $a/\lambda_0$ (vertical axis) and the wave vector kz (horizontal axis) of the first band are substantially proportional, so that also the effective refractive index substantially does not change with respect to changes in $\lambda_0$. However, in the higher order propagation bands (such as the second band and the third band in FIG. 3B), the effective refractive index changes considerably with $\lambda_0$, and according to FIG. 3B, the value of $a/\lambda_0$ stays substantially constant even when kz approaches zero. That is to say, the effective refractive index may even become less than 1.

Furthermore, it is well known that the value obtained by differentiating the band curves shown in FIG. 3B by kz (that is, the slope of the tangent) is the group velocity of the propagation light. In the case of the second and third band in FIG. 3B (higher order bands), the slope of the tangent of the band curves becomes drastically smaller as the value of kz becomes small, and at kz=0, the slope of the tangent becomes zero. This is due to group velocity anomalies, which are characteristic for photonic crystals. The group velocity anomalies in photonic crystals are very large, and lead to a dispersion that is opposite to that in ordinary homogenous materials (i.e. the group velocity becomes slower, the longer the wavelength of the incident light). Therefore, an optical waveguide that can utilize light propagated in higher-order bands can be utilized as an optical delay element or a dispersion compensation element for optical communication.

Research by the inventors has shown that "when a suitably phase-modulated wave having a period 'a' in the same direction is incident on a layer with multiple films with the period 'a' (one-dimensional photonic crystal), then it is possible to obtain only propagation light belonging to certain higher-order bands." Moreover, it can be understood easily that if the propagation in the waveguide is imagined to be in the opposite direction, then, after the higher-order band propagation light 4 is emitted from the end face 1b of the photonic crystal (see FIG. 1), the emission light 3 can be returned into a plane wave by a suitable phase modulation means.

The following is an explanation of a method for letting only higher-order band propagation light 4 of a phase-modulated wave propagate through a photonic crystal 1.

Figure 4A:
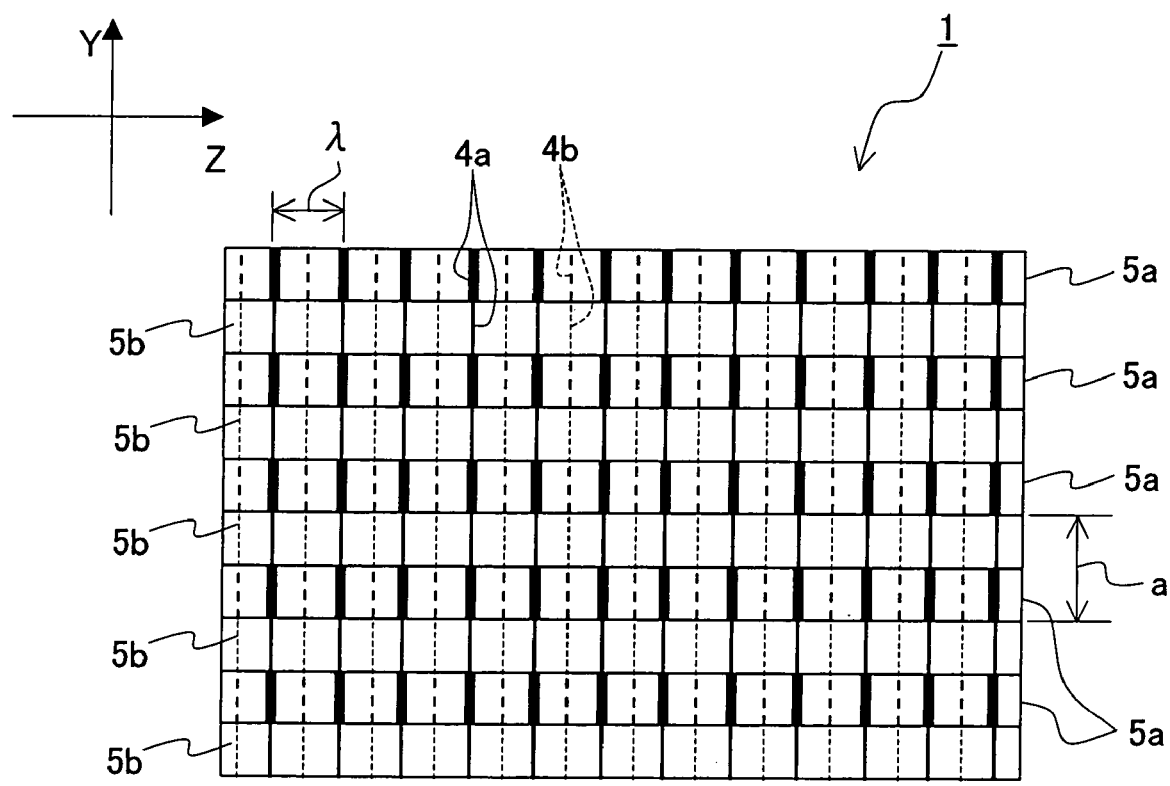
FIG. 4A is a cross-sectional view schematically showing the intensity of the electric field of the first band propagation light in the Z-axis direction within the photonic crystal shown in FIG. 1.
Figure 4B:
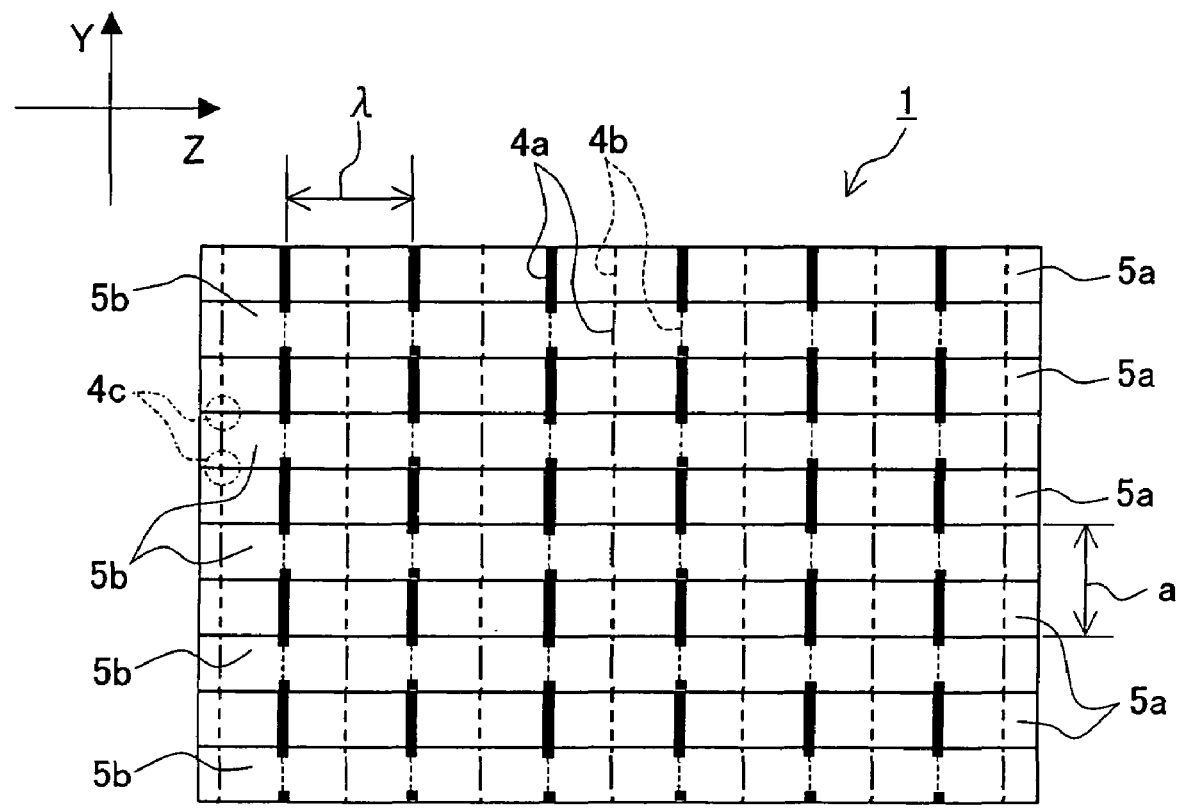
FIG. 4B is a cross-sectional view schematically showing the intensity of the electric field of higher-order band propagation light in the Z-axis direction within the photonic crystal shown in FIG. 1.

FIGS. 4A and 4B are cross-sectional views schematically showing the intensity of the electric field of the propagation light in the photonic crystal 1 shown in FIG. 1. FIG. 4A is a cross-sectional view schematically showing the intensity of the electric field of the first band propagation light in the Z-axis direction within the photonic crystal 1 shown in FIG. 1. FIG. 4B is a cross-sectional view schematically showing the intensity of the electric field of higher-order band propagation light (for example the second band propagation light shown in FIG. 3) in the Z-axis direction within the photonic crystal 1 shown in FIG. 1. FIGS. 4A and 4B are discussed with reference to FIG. 1.

The photonic crystal 1 has multiple layers of a material 5a and a material 5b that are layered periodically. The photonic crystal 1 is a so-called one-dimensional photonic crystal in which the materials 5a and 5b are layered in alternation, and the sum of the thickness of the material 5a and the thickness of the material 5b is equal to the period a of the multi-layer structure 5. The direction of the refractive index periodicity is the Y-axis direction, and the refractive index is uniform in the Z-axis direction, which is the direction in which the propagation light propagates.

The electric field of light is apparent as waves. In FIGS. 4A and 4B, the wave crests 4a of the electric field are represented by solid lines, whereas the wave troughs 4b of the electric field are represented by dashed lines. Also, the amplitude is expressed by the thickness of those lines, and a thicker line represents a larger amplitude. It should be noted that the wavelength of the propagation light is λ.

As shown in FIG. 4A, even though the electric field amplitude of the first band propagation light differs within the material 5a and within the material 5b, the crests 4a and the troughs 4b of the electric field both form a plane that is perpendicular to the Z-axis direction, so that the propagation is close to a plane wave.

By comparison, in the higher-order band propagation light, "nodes 4c" at which the electric field amplitude becomes zero occur near the boundary of the material 5a and the material 5b, as shown in FIG. 4B. Therefore, one period of the layered structure formed by the adjacent materials 5a and 5b is split into two regions with a wave crest and a wave trough. Since the phases of the waves are shifted by half a wavelength at the adjacent regions (material 5a and material 5b), the wave crests and wave troughs are out of synch. It is in the second or the third band that these two nodes 4c per period occur. For the guided light in even higher-order bands, the number of nodes per period increases even more, and shifts by half a wavelength occur several times per period.

Consequently, for incident light 2 of a wavelength at which the first band and higher-order bands contribute, both overlap in the propagation light 4, and form a complex electric field pattern.

Figure 5:
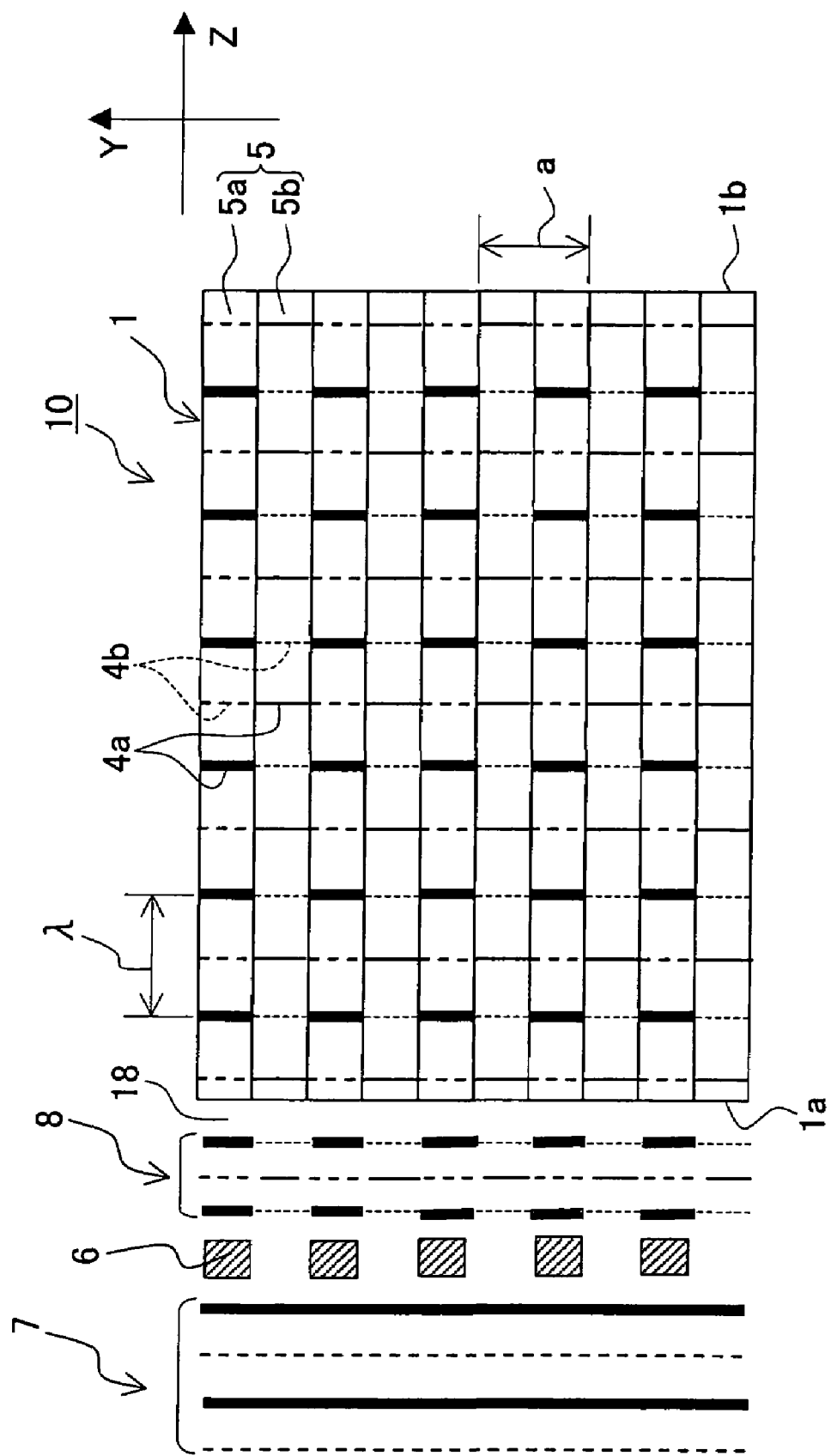
FIG. 5 is a cross-sectional view schematically showing the intensity of the electric field in the Z-axis direction of the propagation light in a waveguide element provided with a phase grating and a photonic crystal.

However, simulations performed by the inventors have shown that by coupling light into the photonic crystal 1 through a phase grating serving as a phase modulation means, it is possible to let only the higher-order band propagation light propagate within the photonic crystal. FIG. 5 is a cross-sectional view schematically showing the intensity of the electric field in the Z-axis direction of the propagation light in a waveguide element provided with a phase grating and a photonic crystal. More specifically, the waveguide element 10 in FIG. 5 is provided with a phase grating 6 serving as a phase modulation means on the side of an end face 1a of the photonic crystal 1 shown in FIG. 1. The phase grating 6 is a phase modulation means with a period a in the Y-direction and causing a difference of substantially half a wavelength. When a plane wave 7 is incident on this phase grating 6, then an electric field pattern resembling the higher-order band propagation light in FIG. 4B is created in the space 18 between the photonic crystal 1 and the phase grating 6. When light 8 having this electric field pattern is incident to the end face 1a of the photonic crystal 1, then only higher-order band propagation light occurs in the photonic crystal 1, whereas first band propagation light does not occur.

Moreover, imagining that the propagation in the waveguide is in the opposite direction, it can be seen that the higher-order band propagation light can be restored into a plane wave by providing a suitable phase modulation means behind the end face 1b of the photonic crystal 1.

Here, the phase grating 6 for obtaining a phase modulation corresponding to the higher-order band propagation light has the same refractive index period in the same direction as the photonic crystal 1. However, in order to attain a large wavelength dispersion and group velocity anomalies in the higher-order band propagation light, it is desirable to make the period a smaller than the wavelength $\lambda_0$. In that case, also the refractive index period of the phase grating 6 becomes smaller than the wavelength, which leads to difficulties during manufacturing. One conceivable method is to form a groove serving as the space 18 in the photonic crystal 1 and to cut away a portion of the photonic crystal 1 and use it as the phase grating, but this necessitates forming a narrow groove with a large aspect ratio with high precision, which is technologically difficult. Furthermore, in order to reduce the first band propagation light and increase the proportion of the higher-order band propagation light, an optimization design is necessary to adjust the distribution ratio of the 0-order diffraction light and the ±1-order light intensity due to the phase grating.

In the present embodiment, in order to solve this problem, the bands on the Brillouin zone boundary are utilized. The following explains this in detail.

Figure 6:
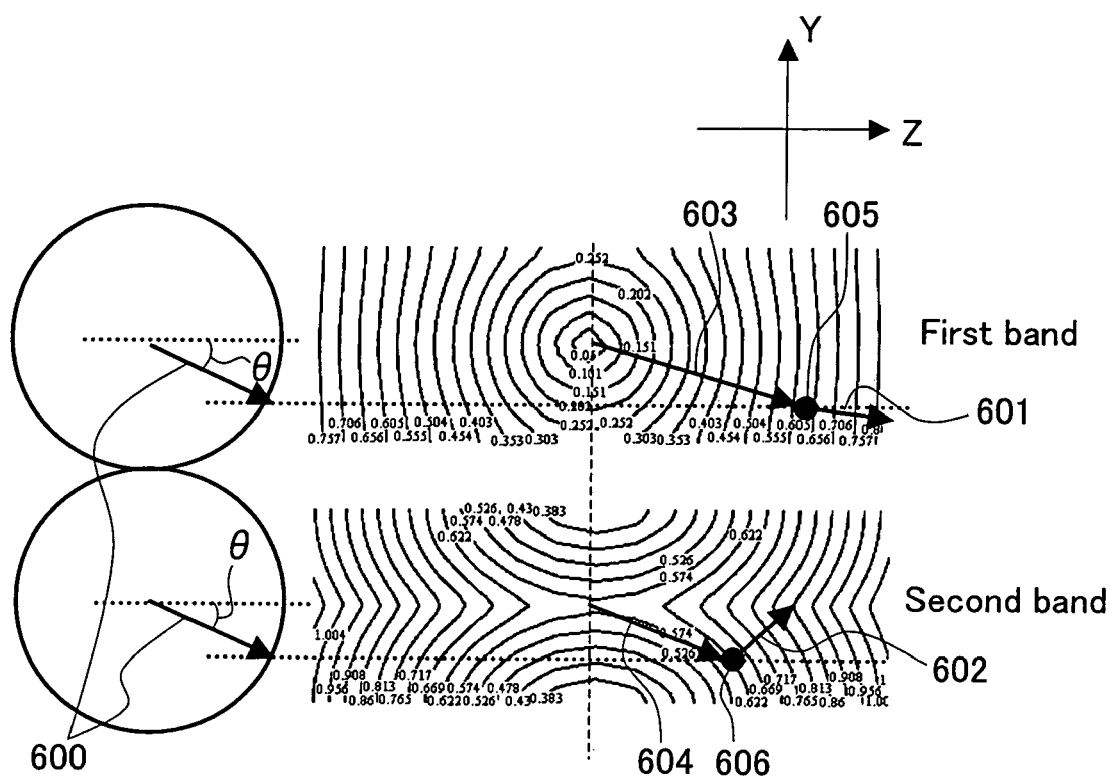
FIG. 6 is a band diagram for the case that the incident light is incident obliquely at an incident angle θ on the photonic crystal shown in FIG. 1.

FIG. 6 is a band diagram for the case that the incident light is incident obliquely at an incident angle θ on the photonic crystal 1 shown in FIG. 1. It should be noted that the incident angle θ is the angle defined by the incident light and the direction perpendicular to the incidence plane, that is, the Z-axis. Furthermore, it is assumed that the tilt of the incident light is confined to being within the YZ-plane. Note that the incidence end face 1a of the photonic crystal 1 is perpendicular to the Z-axis. In this case, the direction in which the wave propagated through the photonic crystal 1 advances is the direction normal to the lines of equal frequency, so that there are two such directions, and it can be seen that it is not perpendicular to the Z-axis. It should be noted that in the first band and in the second band, there are a correspondence point 605 and a correspondence point 606 at which the normalized frequency $a/\lambda_0$ matches the incident light, so that waves corresponding to these bands are propagated through the photonic crystal 1. The wave vector of the incident light is indicated by the arrow 600, and the wave vector of the propagation light is indicated by the arrows 603 (first band) and 604 (second band). The energy propagation direction of the first band of the propagation light is indicated by the arrow 601, whereas the energy propagation direction of the second band of the propagation light is indicated by the arrow 602.

Figure 7A:
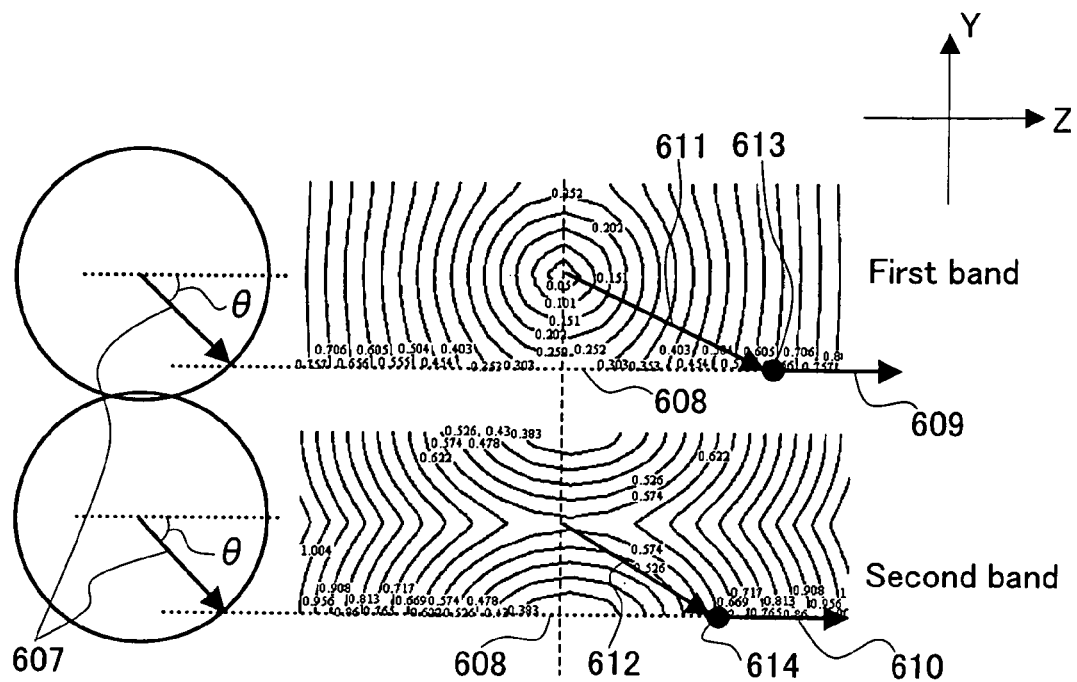
FIG. 7A is a band diagram for the case that the incident light is incident at a predetermined incident angle θ on the photonic crystal shown in FIG. 1.

FIG. 7A is a band diagram for the case that the incident light is incident at a predetermined incident angle θ on the photonic crystal 1 shown in FIG. 1. More specifically, the incident angle θ is set so that the following Equation (1) is satisfied. It should be noted that the end face 1a is perpendicular to the Z-axis direction, which is the direction in which the light propagates, so that "incident at an incident angle θ" means that light that is tilted by θ with respect to the Z-axis is incident.

$$n \cdot \sin\theta \cdot (a/\lambda_0) = \pm 0.5 \tag{1}$$

Here, n denotes the refractive index of the medium next to the end face 1a of the photonic crystal 1, $\lambda_0$ is the vacuum wavelength of the incident light 2, and a is the period of the photonic crystal 1. If the end face 1a of the photonic crystal 1 is adjacent to air, and the light is incident from air, then n is the refractive index of air (=1).

When incident light 2 is incident on the photonic crystal 1 at an incident angle θ that satisfies Equation (1), then there are first and second propagation bands on the Brillouin zone boundary 608, as can be seen from FIG. 7A. In FIG. 7A, the wave vectors of the incident light 2 are indicated by arrows 607, and the direction in which the energy of the propagation light 4 advances in the photonic crystal 1 is indicated by the arrows 609 (first band) and 610 (second band). It should be noted that 613 and 614 are correspondence points at which the normalized frequency $a/\lambda_0$ in the first and the second band matches, and the wave vectors of the propagation light are indicated by the arrows 611 (first band) and 612 (second band).

Due to the symmetry of the Brillouin zone boundary 608, the propagation direction of the wave energy coincides with the Z-axis, so that the propagation light 4 advances in the Z-axis direction. In order to realize propagation in the Z-axis direction, the condition to be satisfied by the incident angle θ also may be set to $n \cdot \sin\theta \cdot (a/\lambda_0) = \pm 1.0, \pm 1.5, +2.0$, in consideration of the periodicity of the Y-direction of the Brillouin zones, but as the (absolute) values on the right side increase, larger values for n and θ become necessary, which make implementation difficult.

Figure 7B:
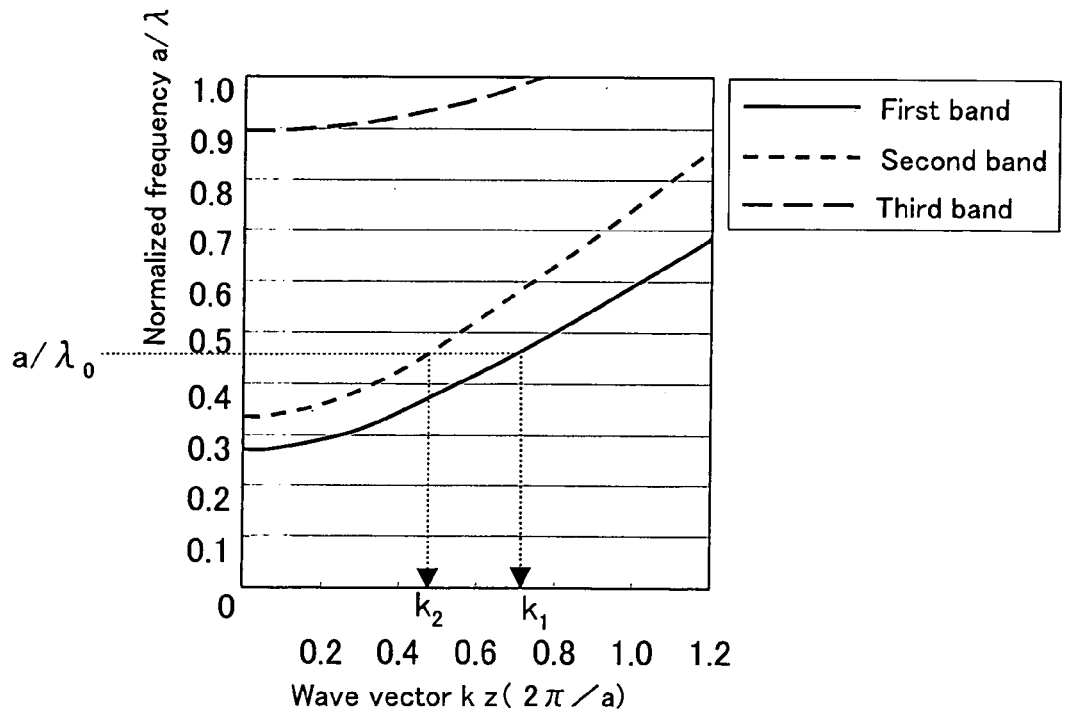
FIG. 7B shows the band diagram on the Brillouin zone boundary in FIG. 7A, limited to the Z-axis direction.

FIG. 7B shows the band diagram on the Brillouin zone boundary in FIG. 7A, limited to the Z-axis direction. As can be seen from FIG. 7B, on the Brillouin zone boundary, all bands, including the first band, exhibit a change that is similar to that of the higher-order bands shown in FIG. 3B. That is to say, in all bands, there is a "large wavelength-dependent change of the effective refractive index" and "group velocity anomalies", so that application to a light-controlling element or the like is possible. The inventors' research has shown that the "propagation at the Brillouin zone boundary" shown in FIG. 7A can be realized by a number of methods, which are discussed in the following.

The following is an explanation of a first method for realizing propagation at the Brillouin zone boundary (multiple band propagation through oblique incidence).

As shown in FIGS. 7A and 7B, a wave in which propagation light of the first and the second band is overlapped can be attained if light of a frequency region in which both the first band and the second band are present is incident on the photonic crystal 1 at the incident angle θ such that the following Equation (1) is fulfilled:

$$n \cdot \sin\theta \cdot (a/\lambda_0) = \pm 0.5 \tag{1}$$

Figure 8A:
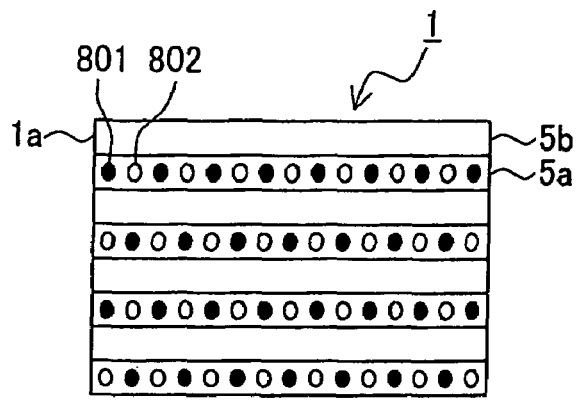
FIG. 8A is a cross-sectional diagram schematically showing the propagation pattern in the first band in the photonic crystal of FIG. 1.
Figure 8B:
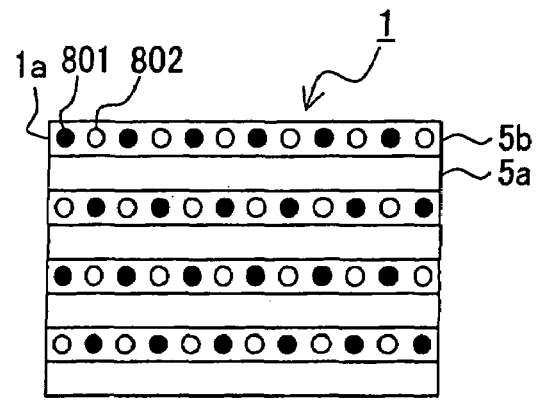
FIG. 8B is a cross-sectional diagram schematically showing the propagation pattern in the second band in the photonic crystal of FIG. 1.
Figure 8C:
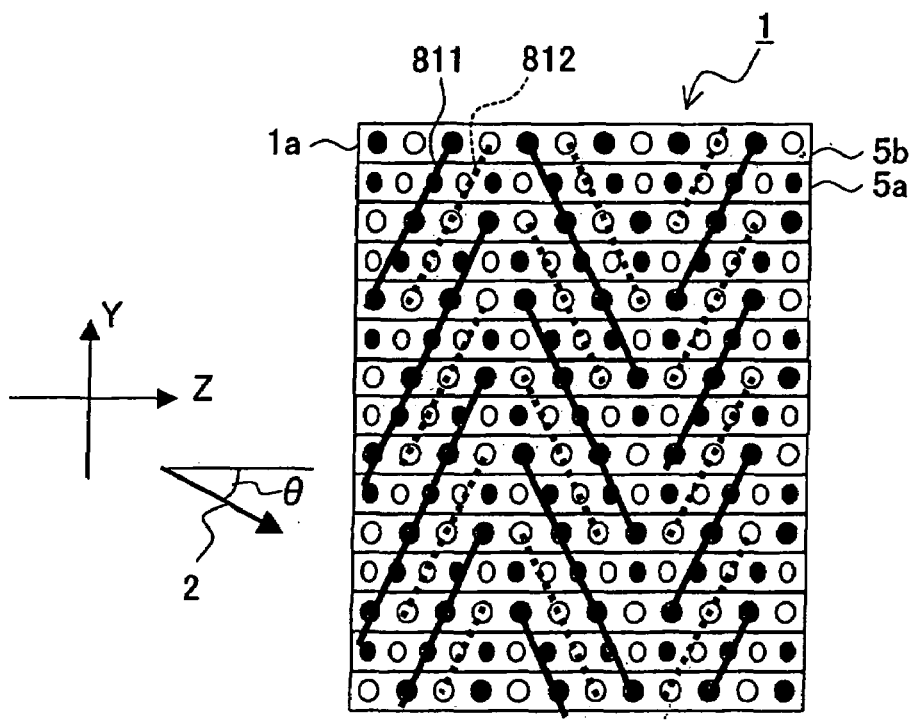
FIG. 8C is a cross-sectional diagram schematically showing the propagation pattern when the propagation patterns of the first band and the second band in the photonic crystal shown in FIGS. 8A and 8B are overlapped.
Figure 12A:
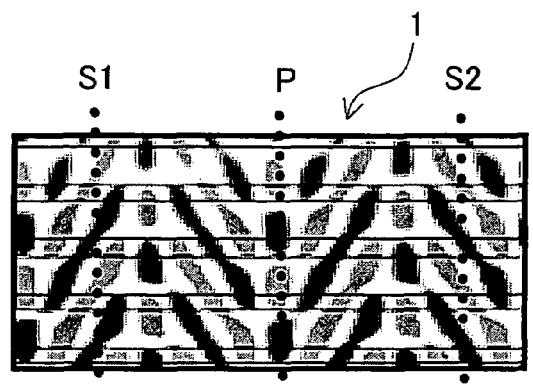
FIG. 12A is a cross-sectional diagram showing the electric field pattern of the propagation light in a photonic crystal in which electromagnetic waves propagate on the Brillouin zone boundary of the first and second bands.

A specific calculation example for the first method is given later. In accordance with the first method, the propagation light 4 in the photonic crystal 1 exhibits a very peculiar electric field pattern in which the electric field amplitude forms a zigzag-shaped pattern, as shown in FIG. 12A. The reason for this can be diagrammatically explained as follows, using FIGS. 8A, 8B and 8C. FIG. 8A is a cross-sectional diagram schematically showing the propagation pattern in the first band in the photonic crystal 1 of FIG. 1. FIG. 8B is a cross-sectional diagram schematically showing the propagation pattern in the second band in the photonic crystal 1 of FIG. 1. FIG. 8C is a cross-sectional diagram schematically showing the propagation pattern when the propagation patterns of the first band and the second band in the photonic crystal shown in FIGS. 8A and 8B are overlapped. In FIGS. 8A and 8B, the wave crests 801 (locations where the electric field amplitude has a maximum on the positive side) and the wave troughs 802 (locations where the electric field amplitude has a maximum on the negative side) are shown. In FIGS. 8A, 8B and 8C, the photonic crystal 1 is identical to the one shown in FIG. 1.

In the propagation light of the first band, high refractive index layers (for example material 5a) are taken as loops and low refractive index layers (for example material 5b) are taken as nodes (see FIG. 8A). Here, the phase is shifted by half a period between adjacent high refractive index layers (material 5a).

Moreover, in the propagation light of the second band, the low refractive index layers (material 5b) are taken as loops, whereas the high refractive index layers (material 5a) are taken as nodes, and the period is longer than in the propagation light of the first band (FIG. 8B). Here, the phase is shifted by half a period between adjacent low refractive index layers (material 5b).

FIG. 8C is the propagation pattern for the case that light of a frequency region in which both the first band and the second band are present is incident on the photonic crystal 1 at an incident angle θ satisfying the condition of Equation (1). FIG. 8C is an overlap of FIGS. 8A and 8B and shows the peaks of the electric field connected by lines. In FIG. 8C, the locations connected by the solid lines 811 are the wave crests of the propagation light, whereas the locations connected by the dashed lines 812 are the wave troughs of the propagation light. As can be seen from FIG. 8C, the light in the photonic crystal 1 forms a pattern in which the lines of crests and troughs lie next to each other in a zigzag-shaped pattern.

That is to say, by letting light of a frequency region in which both the first band and the second band are present be incident on the photonic crystal 1 at an incident angle θ satisfying the Equation (1), it is possible to achieve the phenomena of "large wavelength-dependent change of the effective refractive index" and "group velocity anomalies"

This method is the simplest, since it involves merely tilting the incident light (plane wave). Moreover, the "frequency range in which both the first band and the second band are present" is broad, so that a range can be selected at which the incident angle θ and the refractive index n are easy to realize.

As shown the Calculation Example 1 discussed below, the reflectance at the end face 1 of the photonic crystal 1 is low, and most of the incident light is turned into light propagating through the photonic crystal. Furthermore, when the value of $a/\lambda_0$ is increased, then it is possible to add propagation light of the third and higher-order bands.

However, with this method, propagation light of two or more bands is mixed together. The propagation light of different bands has different wavelengths and group velocities within the photonic crystal, so that this is a large obstacle in devices that necessitate that these properties are uniform. Consequently, this method (method of multiple band propagation through oblique incidence) is particularly suitable for applications in which "it is sufficient that the group velocity of the propagation light is slowed down and non-linear effects are increased."

It should be noted that when the wavelength of the incident light 2 is changed without changing the incident angle θ, then Equation (1) will not be satisfied completely, so that also the direction of energy propagation will deviate from the Z-axis. Consequently, there may be a limitation to the wavelength region at which the properties of the optical device can be maintained.

The following is an explanation of a second method for realizing propagation at the Brillouin zone boundary (propagation of only the first band through oblique incidence).

Figure 9:
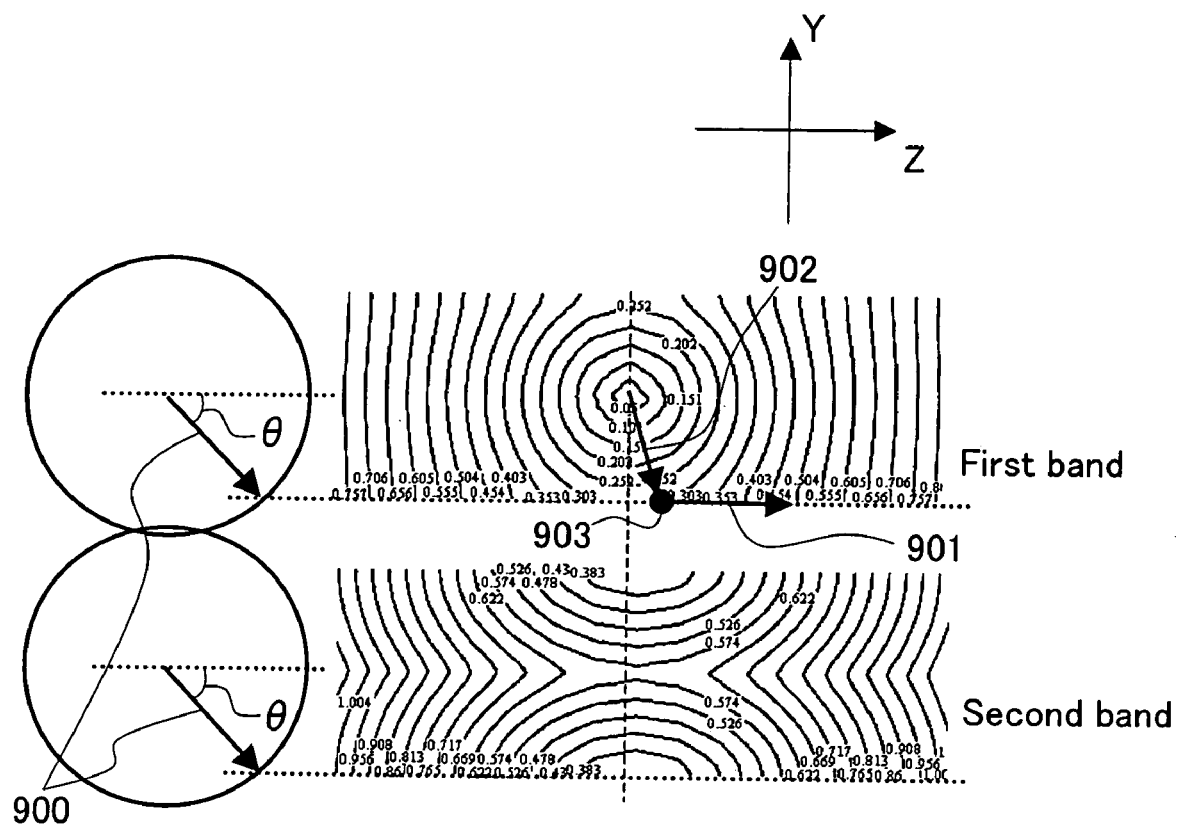
FIG. 9 is a band diagram illustrating the second method.

FIG. 9 is a band diagram illustrating the second method. FIG. 9 shows a band diagram for a frequency region in which only propagation light of the first band is present and propagation light of other bands is not present, since a correspondence point 903 at which the normalized frequency $a/\lambda_0$ coincides with the incident light is present only in the first band. It should be noted that in FIG. 9, arrow 900 indicates the wave vector of the incident light, arrow 902 indicates the wave vector of the propagation light, and arrow 901 indicates the direction of energy propagation.

As shown in FIG. 9, if the incident angle θ is set such that the condition of Equation (1) is satisfied in the frequency region at which there is only propagation light of the first band, then propagation with a single band can be achieved.

Under this condition, the propagation light that propagates through the photonic crystal will have a propagation pattern as shown in FIG. 8A. That is to say, the high refractive index layers (material 5a) are loops and the low refractive index layers (material 5b) are nodes, and there is a phase shift of half a period between neighboring high refractive index layers (material 5a). In other words, even though there is propagation of the first band, this configuration has the characteristics of higher-order propagation (see Calculation Example 2 and FIG. 17B discussed below).

In the second method (propagation of the first band through oblique incidence), only the incident angle of the incident light (plane wave) is tilted, so that it can be implemented easily, like the first method. However, in the "frequency region in which only the first band is present", the value of $a/\lambda_0$ is small, so that both the incident angle θ and the refractive index n need to be made large, and there is the problem that the reflectance at the end face of the photonic crystal becomes rather large, leading to increased loss. Moreover, when the wavelength of the incident light changes while the incident angle θ stays the same, then Equation (1) is not satisfied completely, so that, like in the first method, the direction of energy propagation will deviate from the Z-axis.

Figure 10:
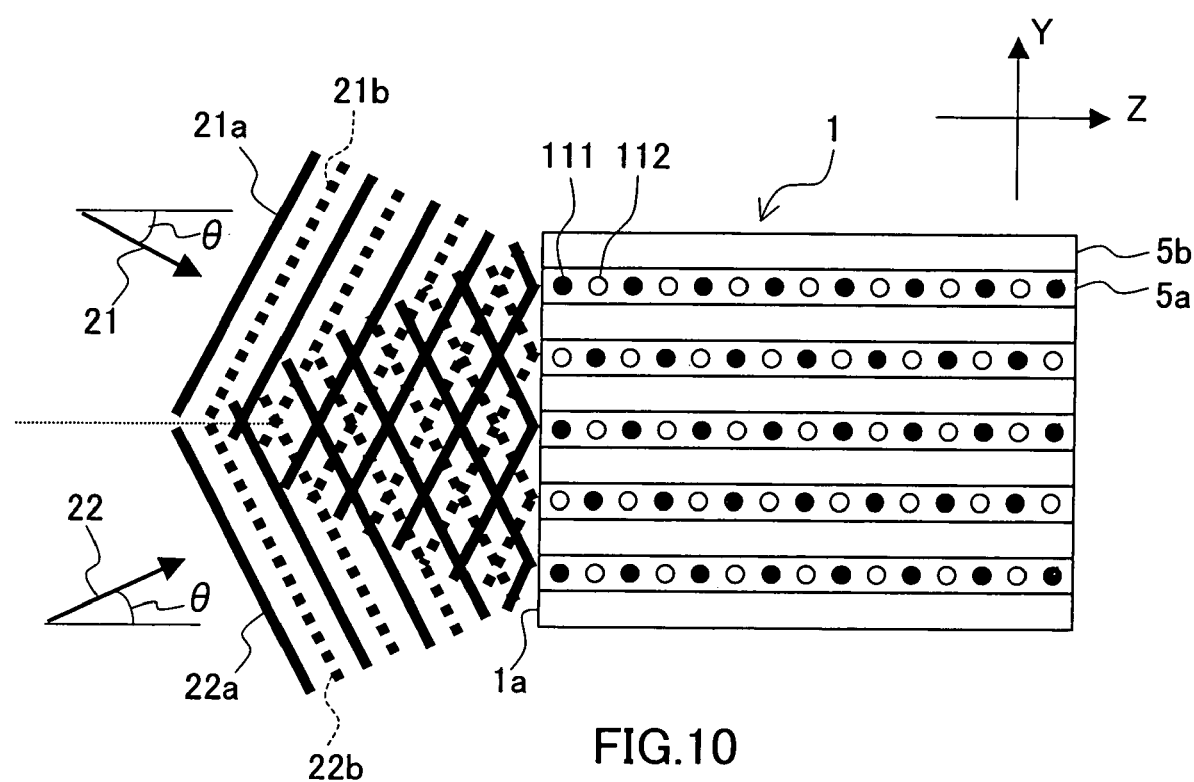
FIG. 10 is a cross-sectional diagram of the photonic crystal shown in FIG. 1 for illustration of the third method.

The following is an explanation of a third method for achieving propagation at the Brillouin zone boundary (phase modulation of incident light through interference of a plane wave). FIG. 10 is a cross-sectional diagram of the photonic crystal 1 shown in FIG. 1, illustrating this third method. In FIG. 10, the photonic crystal 1 is the same as the one used in FIG. 1.

As shown in FIG. 10, plane waves 21 and 22 having the same wavelength are incident on the photonic crystal 1, intersecting at incident angles of ±θ. It should be noted that in FIG. 10, the wave crests 21a and 22a of the electric field of the plane waves 21 and 22 are depicted by solid lines, whereas the wave troughs 21b and 22b of the electric field are depicted by dashed lines.

By letting plane waves 21 and 22 whose incident angles intersect each other at ±θ be incident, an electric field pattern with loops and nodes in Y-direction is formed on the incident end face 1a of the photonic crystal 1, through interference of the two plane waves 21 and 22. Accordingly, the photonic crystal 1 is arranged such that the high refractive index layers (material 5a) are at the loop portions. Note that the crests 111 and troughs 112 of the propagation light are shown in the figure. Thus, only the propagation light of the first band is propagated (see Calculation Example 3 and FIG. 18 below). When the photonic crystal 1 is arranged such that the low refractive index layers are at the loop portions, then only the propagation light of the second band is propagated (see Calculation Example 4 and FIG. 19 below).

At this time, the value of the incident angle θ must satisfy Equation (1), as in the first and the second methods.

Also in this method, Equation (1) is not completely satisfied if the wavelength of the incident light is changed while the incident angle is kept fixed, leading to a deviation of the period pitch to the photonic crystal side, so that there are limitations regarding the wavelength region in which the characteristics suitable for an optical device can be maintained.

The following is an explanation of a fourth method for realizing propagation at the Brillouin zone boundary (phase adjustment of the incident light through a phase grating with a period 2a).

Figure 11:
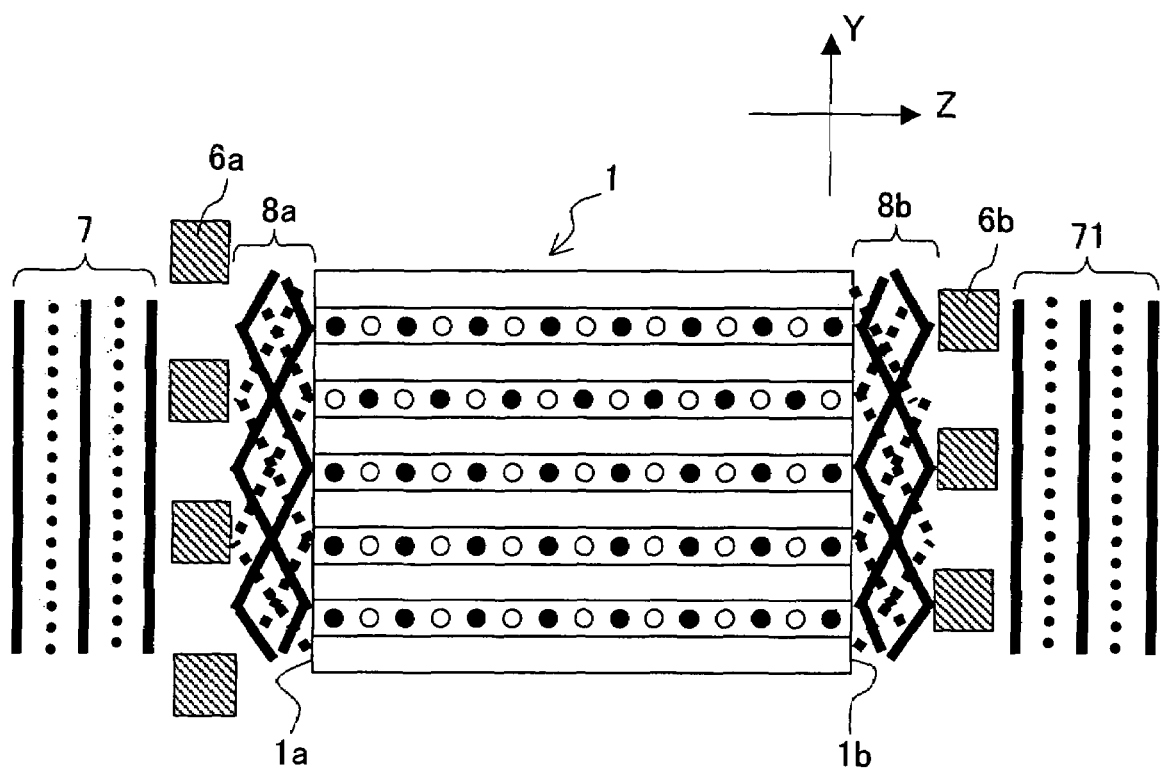
FIG. 11 is a cross-sectional diagram of the photonic crystal in FIG. 1 for illustration of the fourth method.

FIG. 11 is a cross-sectional diagram of the photonic crystal in FIG. 1 for illustration of the fourth method. In the fourth method, a phase grating 6a and a phase grating 6b having twice the refractive index period (2a) of the refractive index period a of the photonic crystal 1 are arranged in contact or in close proximity to the incident end face 1a and the emission end face 1b of the photonic crystal 1. In this situation, the incident end face and the emission end face of the phase gratings 6a and 6b are perpendicular to the propagation direction (Z-axis direction). When a plane wave 7 is perpendicularly incident on the phase grating 6a, then it is possible to achieve an electric field pattern with the same nodes and loops as with the "interference of plane waves" shown in FIG. 10, through interference of the +1 and −1 diffraction light. This means that by letting the plane wave 7 of the incident light pass through the phase grating 6a, the light 8a becomes similar to the plane waves 21 and 22 in FIG. 10. That is to say that two intersecting plane waves are generated at incident angles satisfying Equation (1). Accordingly, when the photonic crystal 1 is arranged such that the high refractive index layers are at the loop portions, then only propagation light of the first band is propagated (see Calculation Example 5 and FIG. 20A discussed below). And when the photonic crystal 1 is arranged such that the low refractive index layers are at the loop portions, then only propagation light of the second band is propagated (see Calculation Example 6 and FIG. 22 discussed below).

When diffraction light of zero order and of second or higher order due to the phase grating 6a is mixed, then it cannot be coupled with certain bands of the photonic crystal, so that ideally, both the +1-order light and the −1-order light have a diffraction efficiency of 50%. Consequently, it is preferable that the phase grating 6a has a shape that is optimized such that the ±1-order diffraction light is as strong as possible.

Also, in a phase grating that is optimized for a certain wavelength, the efficiency of the 1-order diffraction light does not decrease drastically when the wavelength is changed only slightly, so that it stays at a high level. Therefore, the usable wavelength range of the fourth method (phase modulation of incident light through phase grating of period 2$a$) can be made broader than in the other methods. Also, by arranging a phase grating 6b with the same period as the phase grating 6a at the emission side 1b of the photonic crystal 1, it is possible to convert the light 8b that is emitted from the photonic crystal 1 into emission light 71 that is a plane wave.

The following is an explanation of a fifth method for realizing propagation at the Brillouin zone boundary (utilization of interference waves through phase grating with period a and oblique incident light).

Figure 12B:
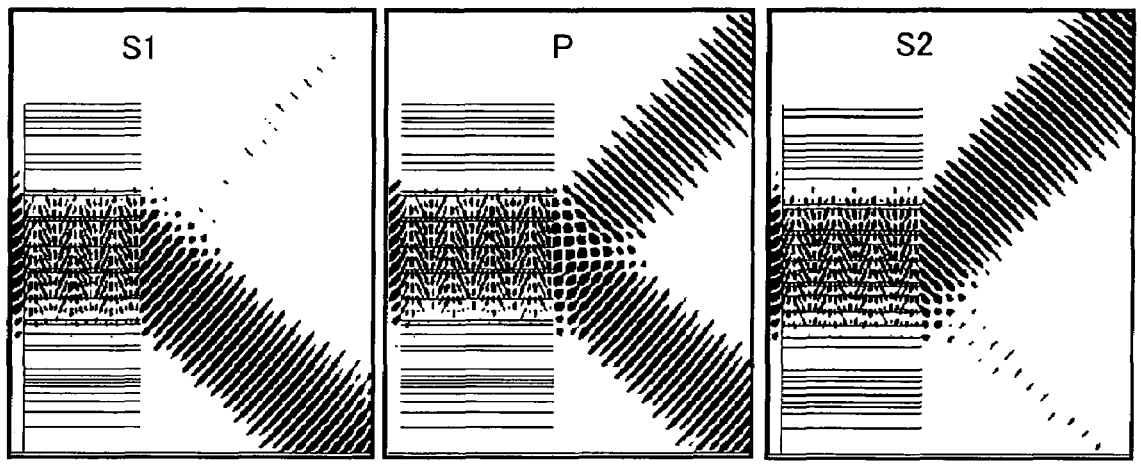
FIG. 12B shows the simulation results of the propagation patterns of the emitted light for the case that the emission end is set to various locations in FIG. 12A.

In the propagation light in the photonic crystal 1 in which the propagation light of the first and second bands coexists, as in the first method (see FIG. 8C), the intensity of the emitted diffraction light can be changed depending on the position at the end face on the emission side. FIG. 12A is a cross-sectional diagram showing the electric field pattern of the propagation light in a photonic crystal in which electromagnetic waves propagate on the Brillouin zone boundary of the first and second bands produced by the first method. FIG. 12A has been determined by simulating FIG. 8C, and the black and grey locations mark the locations where the electric field is strong (wave crests and troughs). FIG. 12B shows the simulation results of the propagation patterns of the emitted light for the case that the emission end is set to various locations (S1, S2, P) in FIG. 12A.

If the emission end is set at a location of an oblique portion of the zigzag pattern, such as the locations S1 or S2 in FIG. 12A, then the diffraction light becomes stronger on one side, as shown in FIG. 12B. If the emission end is set at a location of a top vertex or bottom vertex of the zigzag pattern, such as the location P in FIG. 12A, then the intensity of the diffraction light on both sides is substantially the same, as shown in FIG. 12B.

The interference pattern of the emitted light when the intensity of the diffracted light on both sides is substantially the same is the same as the interference wave that is produced by the phase grating in the case of the fourth method, so that when a photonic crystal with the same period a is arranged directly behind it, it is possible to attain a higher order propagation light of certain bands in the photonic crystal. Consequently, by using such a photonic crystal, in which the intensity of the diffraction light on both sides set to be substantially the same, as a phase grating, it is possible to form the same interference pattern as when using the phase grating used in the fourth method. In the fifth method, it is necessary to let the light be incident on the phase grating at an incident angle θ that satisfies Equation (1). It should be noted that the n in Equation (1) is the refractive index of the medium adjacent to the incident face of the phase grating.

In the fifth method, it is possible to use for example a multi-layer film of the same structure for the phase grating and the photonic crystal (with both having a period of a, naturally). However, it is necessary to perform an adjustment to match the position of the loops and nodes of the electric field due to the interference wave with the photonic crystal side. Furthermore, it is preferable that the condition of Equation (1) is satisfied.

The following is an explanation of a sixth method for realizing propagation at the Brillouin zone boundary (utilization of phase grating with period 2$a$ and interference waves through oblique incidence).

In the fourth method explained using FIG. 11 above, when the value of $a/\lambda_0$ is lower than 0.5, then it becomes difficult to make the intensity of the ±1-order diffraction light large with phase gratings 6a and 6b made of a low refractive index material, such as quartz and air and the like. If the phase gratings 6a and 6b are made using a high refractive index material such as silicon or the like, then the ±1-order diffraction light can be made strong, but there are the problems that the amount of reflection light increases or that the fabrication of the phase gratings 6a and 6b becomes difficult.

Figure 22:
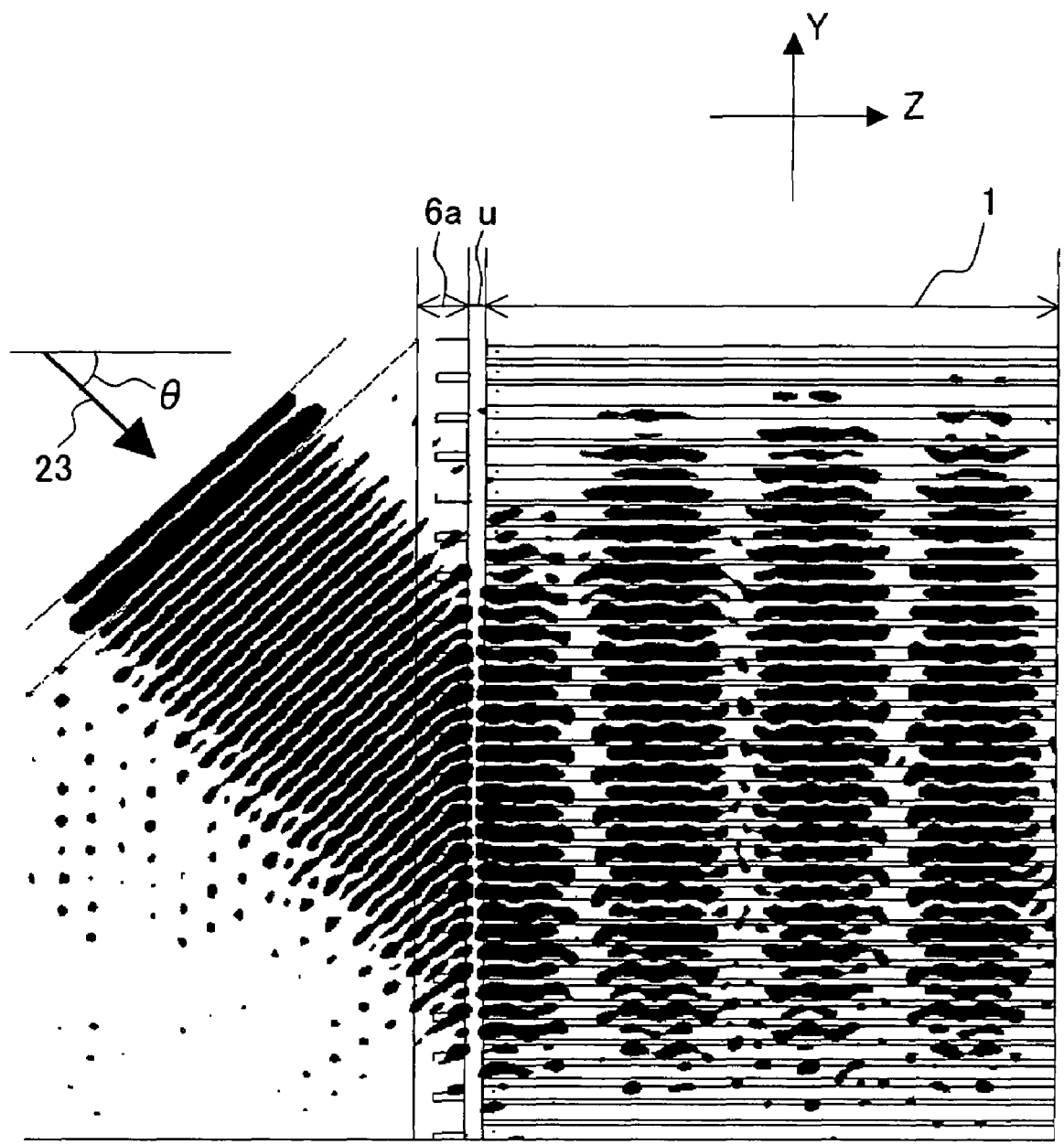
FIG. 22 shows the intensity distribution of the electric field according to a simulation result of Calculation Example 6.

However, when the period of the phase grating 6a is set to 2 a and oblique incident light that satisfies the condition of Equation (1) (incident angle θ) is used, then a pair of diffraction lights causing an interference wave as shown in FIG. 10 can be intensified, even when the value of $a/\lambda_0$ is lower than 0.5, so that when a photonic crystal with period a is arranged directly behind it, it is possible to attain higher-order propagation light of certain bands (see Calculation Example 6 and FIG. 22 discussed below). The sixth method is similar to the fifth method, but differs considerably from it with regard to the fact that the period of the phase grating is 2$a$ (twice the period of the photonic crystal). It should be noted that n in Equation (1) is the refractive index of the medium adjacent to the incident face of the phase grating.

Note that in the fourth to sixth methods, a phase grating having a refractive index period that is the same or twice that of the refractive index period a of the photonic crystal 1 was used as the phase grating, but it is also possible to use a phase grating having a refractive index period that is an integer multiple of the refractive index period a.

Figure 13A:
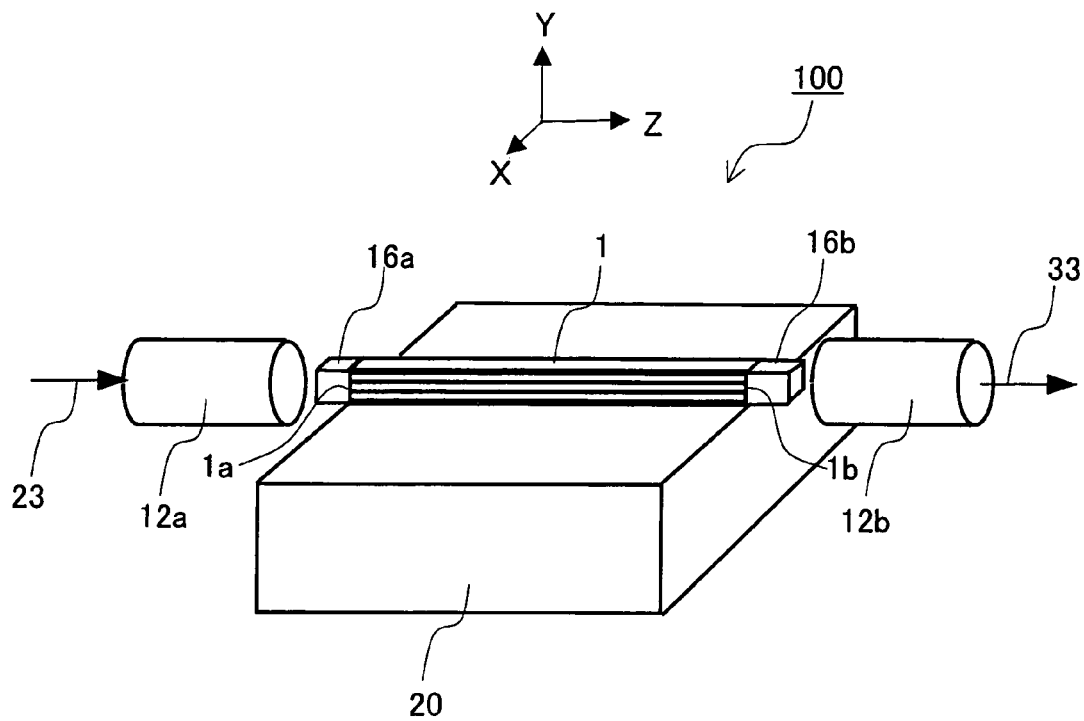
FIG. 13A is a perspective view showing the configuration of an optical waveguide element using a photonic element according to the present embodiment.

With the above-described first to sixth methods for realizing propagation at the Brillouin zone boundary, it is possible to form higher-order band propagation light in a one-dimensional photonic crystal efficiently. The following is a description of waveguide elements using a photonic crystal according to the present embodiment as an optical device for realizing these methods. For example, when the shape of the optical waveguide is as diagrammatically shown in FIG. 13A, then the connection with an optical fiber and the arrangement of the electrodes is easy, which is preferable. FIG. 13A is a perspective view showing the configuration of an optical waveguide element 100 using a photonic element according the present invention. In FIG. 13A, a one-dimensional photonic crystal 1 having a refractive index periodicity in one direction as shown in FIG. 1 is formed on a suitable substrate 20. In FIG. 13A, it is preferable that the one-dimensional photonic crystal 1 is shaped into a line-shaped waveguide, in order to reduce propagation modes in the X-direction and achieve single mode propagation. Phase gratings 16a and 16b, which are phase modulation portions according to the fourth method, are arranged at both sides of this photonic crystal 1. Furthermore, a coupling means, such as a rod lens 12a, coupling the incident light 2 into the phase grating 16a is provided. This rod lens 12a converges the incident light 23 onto the end face of the phase grating 16a. Thus, it is possible to let the light be perpendicularly incident on the phase grating 16a. By configuring the relation between the phase grating 16a and the photonic crystal 1 as shown in the fourth method, propagation at the Brillouin zone boundary is accomplished in the photonic crystal 1. Thus, it is possible to cause "very large wavelength dispersion", "group velocity anomalies" and the like. Consequently, the waveguide element 100 can be used as an optical control element, such as an optical delay element or a dispersion compensation element for optical communication.

Figure 13B:
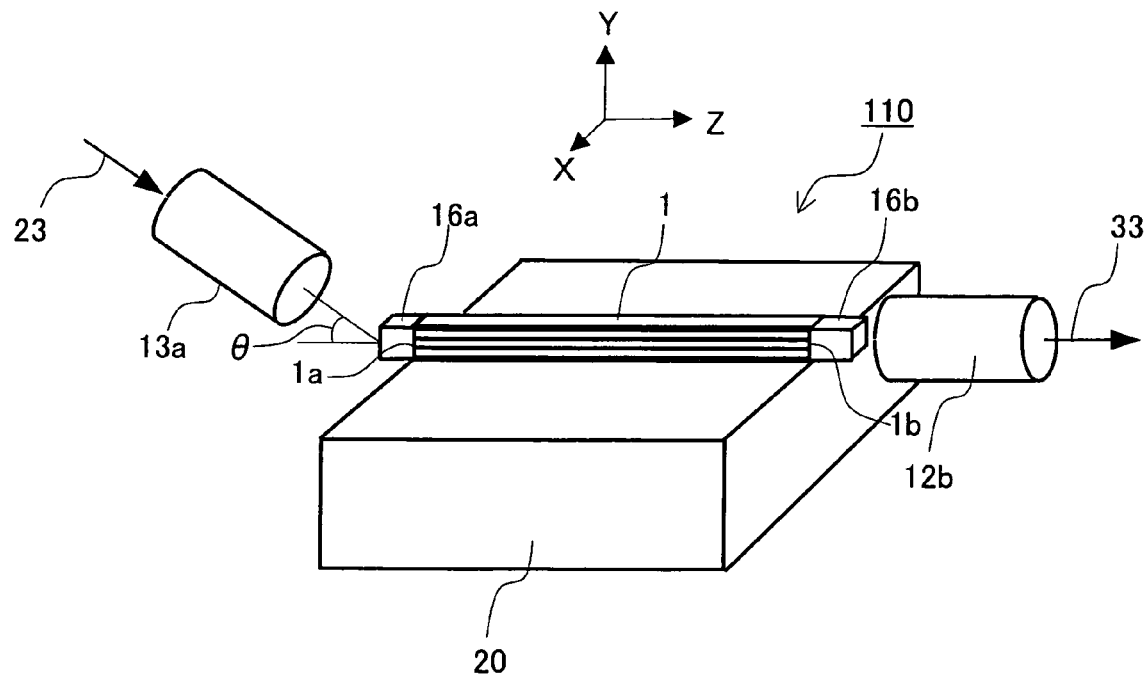
FIG. 13B is a perspective view showing the configuration of a waveguide element using another photonic crystal according to the present embodiment.

FIG. 13B is a perspective view showing the configuration of a waveguide element 110 using another photonic crystal according to the present embodiment. As shown in FIG. 13B, instead of having the rod lens 13a cause the light to be perpendicularly incident on the phase grating 16a (such that the light advances in the Z-axis direction), it is also possible that the light is incident obliquely at an incident angle θ. The incident light 23 is coupled from the end face 1a through the phase grating 16a into the photonic crystal 1. The photonic crystal 1 is an optical waveguide, and the coupled light is propagated through the photonic crystal 1. After it has been propagated through the photonic crystal 1, the light is emitted from the emission end face 1b, is incident through, for example, the phase grating 16b of the fourth method onto the rod lens 12b serving as the emission portion, and is emitted as emission light 33.

The arrangement of the phase grating 16a and the photonic crystal 1 as well as their refractive index periods should be as noted in the above-described fifth method and sixth method. That is to say, the light 23 emitted from the rod lens 12a is incident on the phase grating 16a at an incident angle θ that satisfies Equation (1). Thus, propagation at the Brillouin zone boundary can be realized in the photonic crystal 1. Therefore, it is possible to cause for example "very large wavelength dispersion" and "group velocity anomalies". Consequently, the waveguide element 110 can be used as an optical control element, such as an optical delay element or a dispersion compensation element for optical communication.

Moreover, in the waveguide elements 100 and 110, a phase grating 16b in accordance with the fourth, fifth or sixth method may be arranged at the emission end face 1b. It should be noted, however, that FIGS. 13A and 13B illustrate the case of the fourth method. Thus, since the light emitted from the end face 1b is phase-modulated, excessive diffraction of emission light can be prevented. When a phase modulation is applied by means of the phase grating 16b, then it is possible to attain emission light of a plane wave shape. The incidence end and the emission end of the phase grating 16b should be arranged opposite from the orientation of the phase grating 16 on the incidence side. That is to say, the end face on the side of the photonic crystal 1 in the phase grating 16a should also be arranged as the end face on the side of the photonic crystal 1 in the phase grating 16b.

Moreover, as shown in FIG. 13A, if phase gratings are placed symmetrically at both sides, namely the incidence side and the emission side, of the photonic crystal 1, then the same effect is applied to propagation light of either direction, so that it is possible to couple light from an optical fiber to both the phase grating 16a and the phase grating 16b. That is to say, it is possible to take either side of the photonic crystal 1 as the incidence sides. (See Calculation Example 5 and FIG. 20A described below).

In the waveguide elements 100 and 110 shown in FIGS. 13A and 13B, the phase gratings 16a and 16b should be placed in close proximity with the end faces 1a and 1b, or in contact with the end faces 1a and 1b of the photonic crystal 1. Also, if the structure of the photonic crystal 1 and the phase gratings 16a and 16b is the same, then they also may be formed in one piece.

Figure 13C:
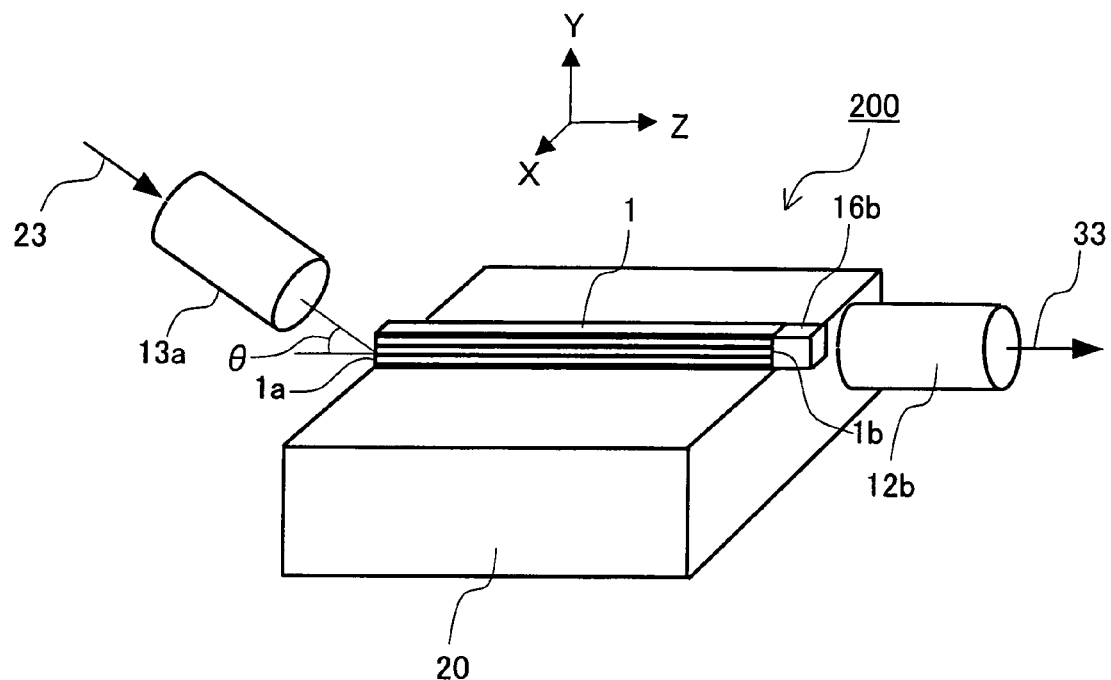
FIG. 13C is a perspective view showing the configuration of a waveguide element using another photonic crystal according to the present embodiment.

FIG. 13C is a perspective view showing the configuration according to a waveguide element 200 using another photonic crystal of the present embodiment. In the waveguide element 200 of FIG. 13C, the grating element 16a of FIG. 13A is not provided, and instead of the rod lens 12a, a rod lens 13a (input portion) is provided, which lets light be incident on the end face 1a at an incident angle θ that satisfies the condition of Equation (1). Thus, it is possible to realize a waveguide element using a photonic crystal according to the present embodiment, employing the first method and the second method.

Figure 13D:
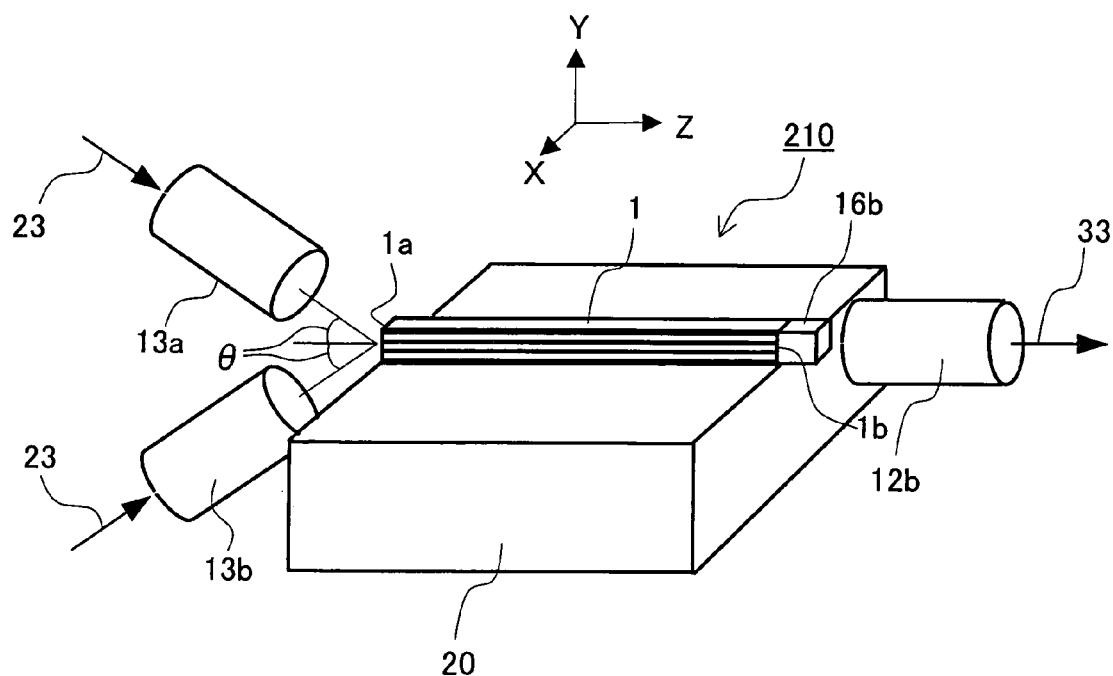
FIG. 13D is a perspective view showing another configuration of a waveguide element using a photonic crystal according to the present embodiment.

Moreover, FIG. 13D is a perspective view showing another configuration of a waveguide element 210 using a photonic crystal according to the present invention. The waveguide element 210 of FIG. 13D corresponds to the waveguide element 200 of FIG. 13C, which is further provided with a rod lens 13b that causes light to be incident on the end face 1a at an incident angle of (−θ). Thus, it is possible to realize a waveguide element using a photonic crystal according to the present embodiment, employing the above-described third method.

Here, in order to let the photonic crystal 1 in FIGS. 13A to 13D function as an optical waveguide, the light needs to be confined in vertical direction (Y-axis direction) and in lateral direction (X-axis direction). The following is an explanation of means for confinement in both directions.

First, the confinement of light in the vertical direction is explained. The vertical direction is the direction of the refractive index period of the photonic crystal 1.

If the effective refractive index in the Z-direction of the higher-order propagation band light (propagation direction of the light) is larger than the refractive index of the medium around the photonic crystal 1 portion, then confinement is attained through this refractive index difference alone. However, if the effective refractive index is smaller than the refractive index of the surrounding index, then the propagation light leaks out on the medium side. That is to say, in this case, light does not propagate through the photonic crystal 1. It should be noted that in the embodiment shown in FIGS. 13A to 13D, nothing is placed around the photonic crystal 1, so that the surrounding medium is air or the substrate 20. Here, in particular when the effective refractive index of the higher-order propagation band light becomes lower than the refractive index of the substrate 20, then leakage of propagation light cannot be prevented, even if the surrounding medium is air.

Figure 14A:
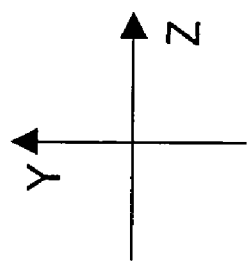
FIG. 14A is a cross-sectional view showing the structure of a photonic crystal provided with reflective layers.
Figure 14A:
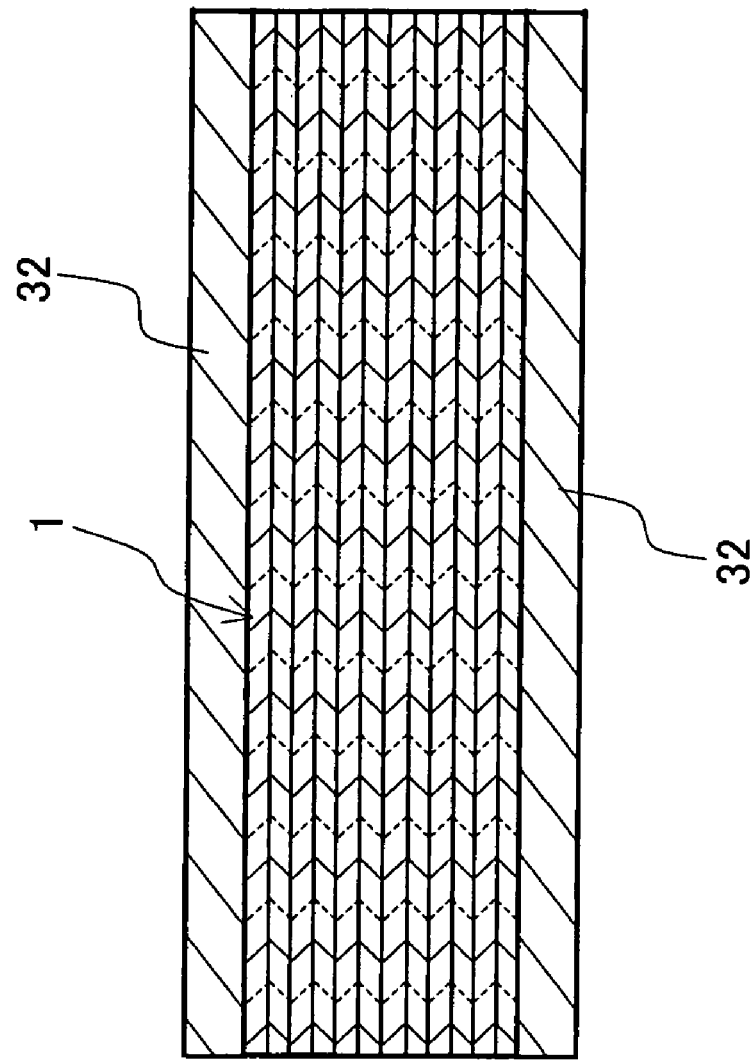
Figure 14B:
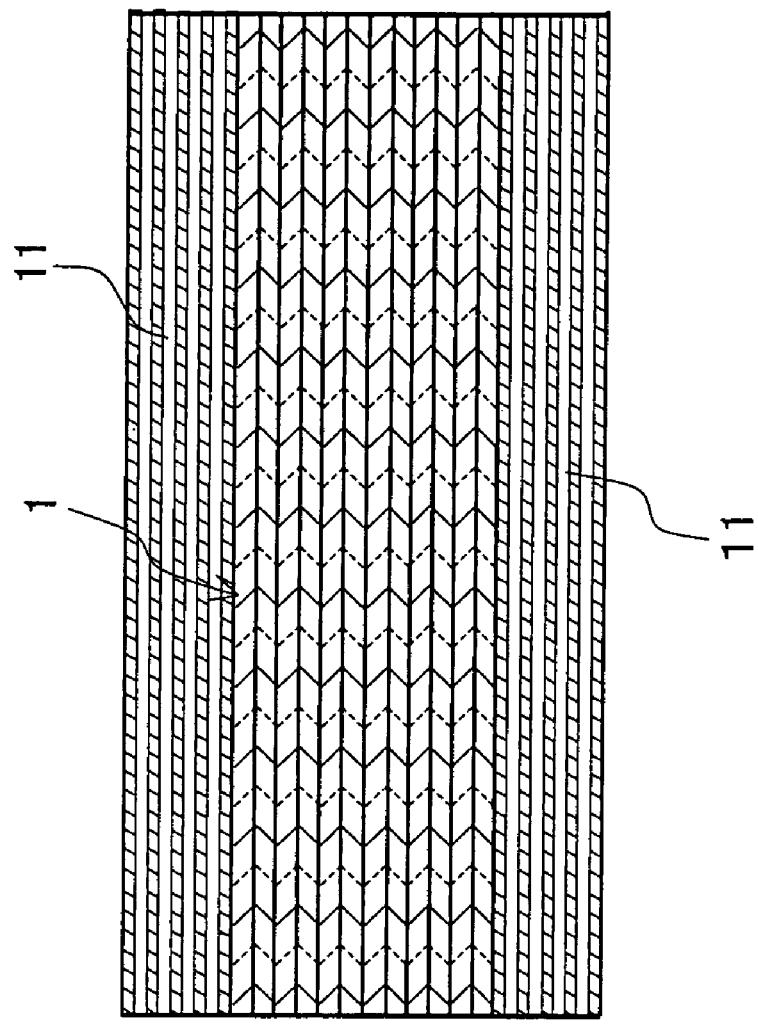
FIG. 14B is a cross-sectional view showing the structure of a photonic crystal provided with a photonic crystal cladding.
Figure 14B:
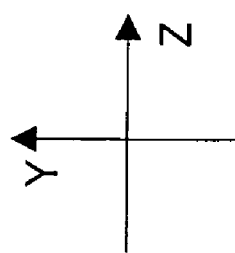

FIG. 14A is a cross-sectional view showing the structure of a photonic crystal 1 provided with reflective layers 32. FIG. 14B is a cross-sectional view showing the structure of a photonic crystal 1 provided with a photonic crystal cladding 11. In order to prevent leakage of propagation light, it is possible to provide reflective layers 32 made of metal films or the like on top of and below the photonic crystal 1, as shown in FIG. 14A, for example. However, with this configuration, the problem may occur that the strength of the multi-layer film is decreased due to the reflective layers 32 or that the propagation light is attenuated due to insufficient reflectance of the reflective layer. In this case, a photonic crystal cladding 11 having a different refractive index period or a different structure from the photonic crystal 1 should be placed on top of and below the photonic crystal 1, for example as shown in FIG. 14B. The structure of the photonic crystal 11 should be designed as appropriate with regard to the structure of the photonic crystal 1. It should be noted that instead of placing the reflective layers 32 and the photonic crystal cladding 11 on both sides of the photonic crystal 1, it is also possible to place them only on either side.

Figure 15:
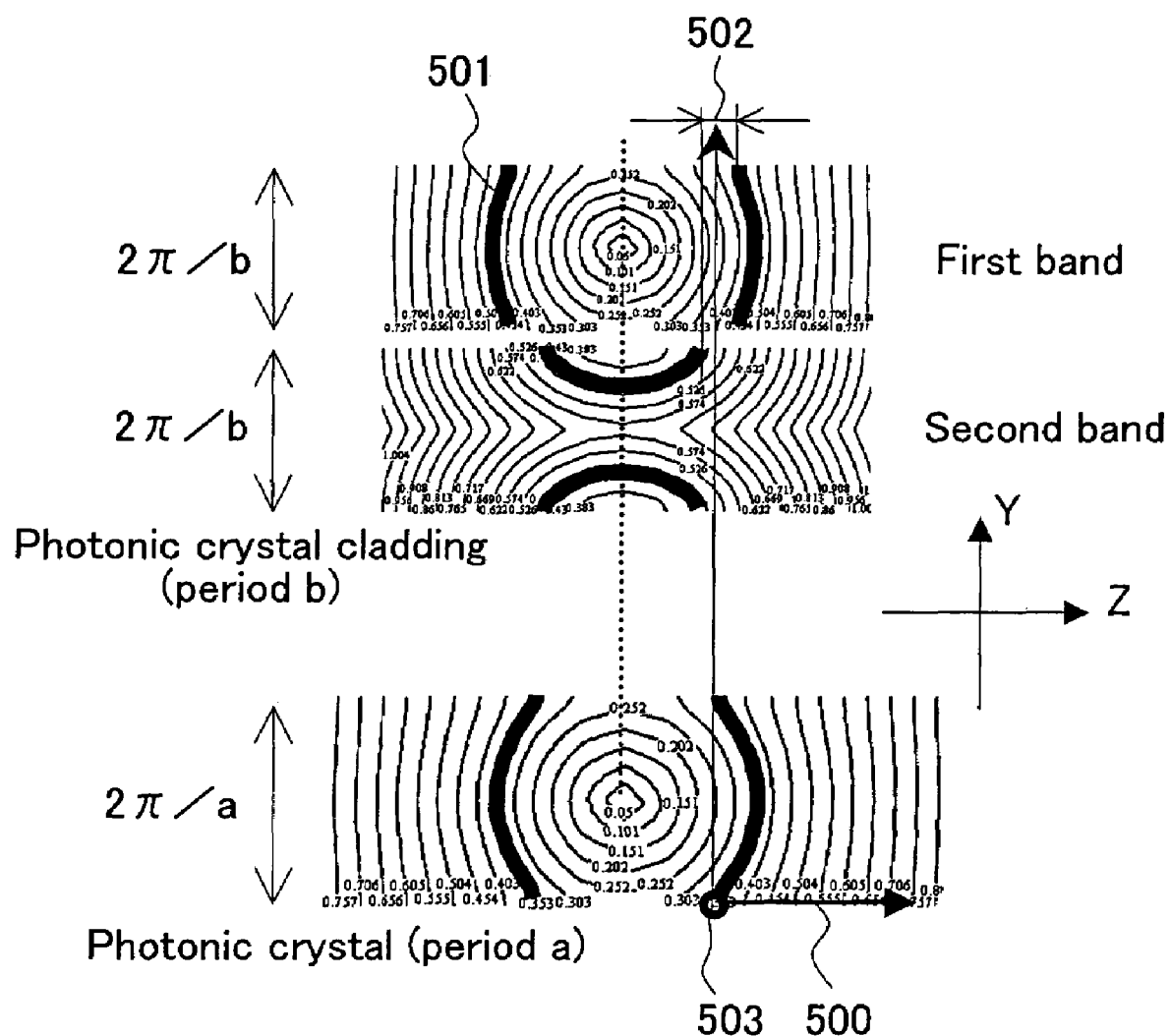
FIG. 15 diagrammatically shows a band diagram for a specific wavelength for a one-dimensional photonic crystal adjacent to a one-dimensional photonic crystal cladding.

FIG. 15 diagrammatically shows a band diagram for a specific wavelength $\lambda_0$ in a one-dimensional photonic crystal 1 of a period a and a one-dimensional photonic crystal cladding 11 with a period b (where b>a) (see FIG. 14B).

In the first band, there is a correspondence point 503 where the normalized frequency $a/\lambda_0$ matches the incident light. Consequently, propagation light propagating in the Z-direction (in the first band) propagates at the Brillouin zone boundary within the photonic crystal 1. In FIG. 15, arrow 500 shows the direction in which the energy of the propagation light advances. Also, a band 501 for the wavelength $\lambda_0$ is shown. In the photonic crystal cladding 11, there is a region where there is no band in the Z-direction (band gap 502), and there is no band corresponding to the propagation within the photonic crystal 1. Consequently, the propagation light of the photonic crystal 1 is not coupled into the photonic crystal cladding 11. That is to say, the propagation light is confined.

The material and the structure of the photonic crystal cladding 11 for the confinement also may be different from that of the photonic crystal 1 for propagation. Considering the efficiency of fabricating a multi-layer film serving as a one-dimensional crystal, it is preferable that the same material is used and the period is made smaller. It should be noted that the design should be performed such that it is confirmed by a band calculation that bands corresponding to the wave vector of the propagation light in the wavelength region and the propagation band used on the side of the photonic crystal 1 do not exist on the side of the photonic crystal cladding 11 (see Calculation Example 7 and FIG. 23 described below).

It should be noted that the determination of the confinement of light with the band diagram shown in FIG. 15 presupposes that the photonic crystal cladding 11 has an infinite periodic structure, so that when the period number of the photonic crystal for the confinement is for example three periods, then the confinement may be insufficient and the propagation light may leak outside. Also, it is not preferable to make the period number unnecessarily large, in view of costs as well as the durability and precision of the multi-layer film. Accordingly, it is preferable that the minimum period number that is necessary in practice is determined through experiments or electromagnetic wave simulation.

The following is an explanation of confinement in the lateral direction. The photonic crystal 1 has a uniform refractive index in the lateral direction (X direction).

At the side faces in lateral direction (X-axis direction) of the photonic crystal 1 of the waveguide elements 100, 110, 200 and 210 shown in FIGS. 13A to 13D, the core portion of the photonic crystal is exposed to a layer of air. According to simulations carried out by the inventors, "alternating (or staggered) electric field patterns" are exposed at the side faces of the photonic crystal 1, and the amplitude at the peaks of the electric field peaks is always the same. Consequently, the diffracted waves from the side surfaces of the photonic crystal 1 cancel each other and there is no propagation to the side of the air, so that the propagated light stays confined (see Calculation Example 8 and FIG. 25 discussed below).

In the waveguide element using the photonic crystal according to the embodiment shown in FIGS. 13A to 13D, the group velocity of the higher-order band propagation light varies greatly depending on the wavelength of the incident light, as noted above, so that it can be used for applications such as "dispersion compensation of signal light for optical communication" and "optical delay elements."

Moreover, since, as described above, there is the action of increased non-linear optical effects in propagation light with slow group velocity, it is possible to realize a waveguide-shaped optical element with much larger non-linear optical effects than conventionally, through such means as:

doping the photonic crystal (waveguide) portion with microscopic particles of a substance having optical non-linearity;

placing a thin film layer including a substance displaying optical non-linearity at every period of the photonic crystal (waveguide) portion;

taking a material having optical non-linearity for forming the photonic crystal (waveguide) portion itself.

Regarding the material of the photonic crystal 1 of the waveguide elements 100, 110, 200 and 210 using the photonic crystal according to the embodiments shown in FIGS. 13A to 13D, there is no particular limitation, as long as transparency in the used wavelength region can be ensured. Suitable materials that ordinarily are used for multi-layer films include silica, silicon, titanium oxide, tantalum oxide, niobium oxide, magnesium fluoride and silicon nitride, which are superior with regard to durability and film forming costs. These materials can be formed easily into multi-layer films through well-known methods, such as sputtering, vacuum deposition, ion-assisted deposition and plasma CVD.

The larger the refractive index ratio between the plurality of materials constituting the photonic crystal, the greater is the tendency that the wavelength dispersion also becomes large, so that it is preferable to combine a high refractive index material and a low refractive index material with a large refractive index difference, for applications in which such characteristics are required. That is to say, in the photonic crystal 1 of FIG. 1, the material 5a should be a high refractive index material and the material 5b should be a low refractive index material, for example. In other words, the refractive index ratio of the material 5a and the material 5b should be large. In practice, a refractive index ratio of at least 4 can be realized, when air (refractive index: 1) is used as the low refractive index material and InSb (refractive index n=4.21) is used as the high refractive index material (see "BISHOUK-OUGAKU HANDBOOK" (Microoptics Handbook), p. 224, Asakura Shoten, 1995).

If the refractive index ratio of the material constituting the photonic crystal 1 (material 5a and material 5b) becomes small, then there is the tendency that differences in the properties due to the polarization direction become small, too. Consequently, in the waveguide element using the photonic crystal according to the present embodiment, it is advantageous that the refractive index ratio of the material 5a and the material 5b becomes small, in order to realize polarization independence.

Moreover, in FIGS. 13A to 13D, the photonic crystal 1 is placed on the substrate 20, but it is also possible to use a so-called air-bridge structure, in which no substrate 20 is used.

If a suitable material is selected, then the action of the waveguide element using the photonic crystal according to the present embodiment is displayed particularly well with light in a wavelength region of 200 nm to 20 µm, which ordinarily is used. However, the principle of the photonic crystal can be applied in general to all electromagnetic waves, so that it is also possible to apply the waveguide element using a photonic crystal according to the present embodiment to electromagnetic waves with longer wavelengths or to X-rays or Gamma rays with shorter wavelengths. The wavelength element using a photonic crystal according to the present embodiment has been explained for optical elements, but is not limited to light, and depending on the design, it can be applied to electromagnetic waves of any wavelength. That is to say, the waveguide element using a photonic crystal can be used as an electromagnetic wave controlling element.

It should be noted that the waveguide element using a photonic crystal according to the present embodiment is not limited to the case that the refractive index period of the photonic crystal is only present in one direction. It is also possible to add to a portion of the photonic crystal a new function, such that there is a refractive index periodicity in another direction. For example, with a configuration in which a portion of the photonic crystal 1 shown in FIGS. 13A to 13D is provided with grooves having a period in the Z-direction, it is possible to fabricate a waveguide element reflecting propagation light of a specific frequency region by Bragg reflection.

The following is an explanation of calculation examples of the previous description.

First, an electromagnetic wave simulation was carried out under the following conditions, for the case that a plane wave is incident on an end face of a periodic multi-layer film structure. For the electromagnetic simulation the finite element method (referred to as "FEM" in the following) was used. In the following calculation examples and comparative examples, all lengths are normalized to the period a of the refractive index period in the photonic crystal 1.

CALCULATION EXAMPLE 1

Calculation Example 1 is explained with reference to FIG. 1.

(1) Structural Conditions of the Photonic Crystal 1

In the photonic crystal 1, the material 5a and the material 5b are layered periodically in alternation (see FIG. 1).

Material 5a: thickness $t_A=0.50$ a; refractive index $n_A=1.4578$

Material 5b: thickness $t_B=0.50$ a; refractive index $n_B=1.00$

At both ends of the photonic crystal 1 was an air layer with a refractive index of n=1.0.

Figure 16A:
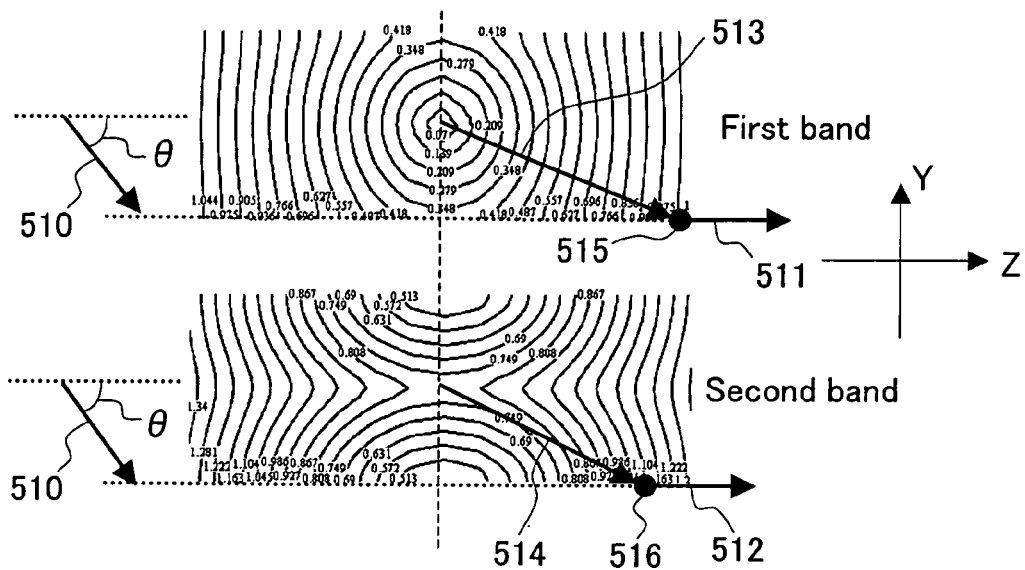
FIG. 16A shows a band diagram for the TE-polarized light in a photonic crystal.

FIG. 16A shows a band diagram for the TE-polarized light of this photonic crystal 1. It should be noted that the arrow 510 in FIG. 16A denotes the wave vector of the incident light 2, the arrow 511 indicates the direction in which the energy of the propagation light 4 advances in the first band, and the arrow 512 indicates the direction in which the energy of the propagation light 4 advances in the second band. Moreover, the correspondence point 515 and the correspondence point 516 are locations where the normalized frequency $a/\lambda_0$ in the first and the second band matches the incident light. The arrow 513 and the arrow 514 denote the wave vector of the propagation light 4.

(2) Conditions of the Incident Light 2

Wavelength in vacuum: $\lambda_0=0.9091$ a ($a/\lambda_0=1.100$)

Polarization: TE polarization (direction of electric field is the X-axis direction)

Incidence angle: θ=27.04°

That is to say, the following equation is satisfied:

$n \cdot \sin \theta \cdot (a/\lambda_0) = 0.5$

Thus, the condition of Equation (1) is satisfied. However, the calculation was performed for a finite region, and the width of the incidence portion of the end face 1a of the photonic crystal 1 was set to 12 periods.

Figure 16B:
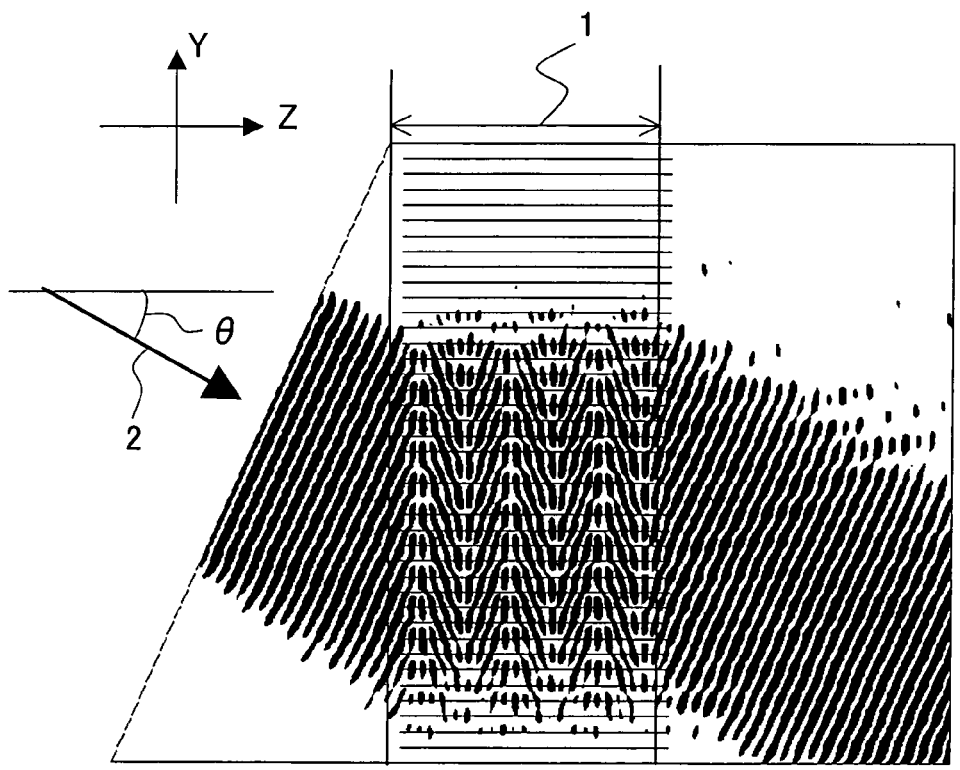
FIG. 16B shows the intensity distribution of the electric field according to the simulation results for Calculation Example 1.

FIG. 16B shows the intensity distribution of the electric field according to the simulation results for Calculation Example 1. In FIG. 16B, the black portions indicate regions where the electric field is strong (crests and troughs of the amplitude). As can be seen from the band diagram (FIG. 16A), there is propagation at the Brillouin zone boundary due to the first band and the second band under the conditions of Calculation Example 1, so that a characteristic zigzag-shaped electric field pattern appears. That is to say, "a very large wavelength dispersion" and "group velocity anomalies" can be attained.

This is an example of the above-described first method (multiple band propagation through oblique incidence).

CALCULATION EXAMPLE 2

Calculation Example 2 is explained with reference to FIG. 1.

(1) Structural Conditions of the Photonic Crystal 1

In the photonic crystal 1, the material 5a and the material 5b are layered periodically in alternation (see FIG. 1).

Material 5a: thickness $t_A=0.50$ a; refractive index $n_A=1.4578$

Material 5b: thickness $t_B=0.50$ a; refractive index $n_B=1.00$

At both ends of the photonic crystal 1 was a medium with a refractive index of n=2.5.

Figure 17A:
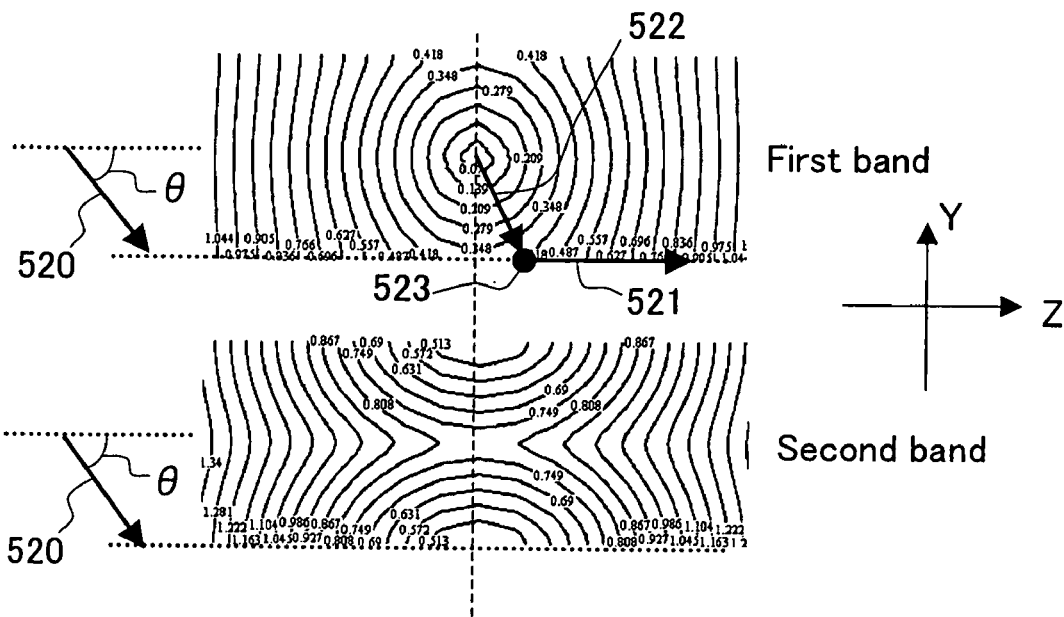
FIG. 17A is a band diagram for Calculation Example 2.

FIG. 17A shows a band diagram for this Calculation Example 2. The arrow 520 in FIG. 17A denotes the wave vector of the incident light 2, the arrow 521 indicates the direction in which the energy of the propagation light 4 advances in the first band, and the correspondence point 523 is a location where the normalized frequency $a/\lambda_0$ in the first band matches the incident light. The arrow 522 denotes the wave vector of the propagation light 4. The bands of FIG. 17A and FIG. 16A are the same, but the values of $a/\lambda_0$ are different, so that the correspondence point 523 exists only in the first band.

(2) Conditions of the Incident Light 2

Wavelength in vacuum: $\lambda_0=2.3256$ a ($a/\lambda_0=0.43$)

Polarization: TE polarization (direction of electric field is the X-axis direction)

Incidence angle: θ=27.72°

That is to say, the following equation is satisfied:

$n \cdot \sin \theta \cdot (a/\lambda_0) = 0.5$

Thus, the condition of Equation (1) is satisfied. However, the calculation was performed for a finite region, and the width of the incidence portion of the end face 1a of the photonic crystal was set to 12 periods.

Figure 17B:
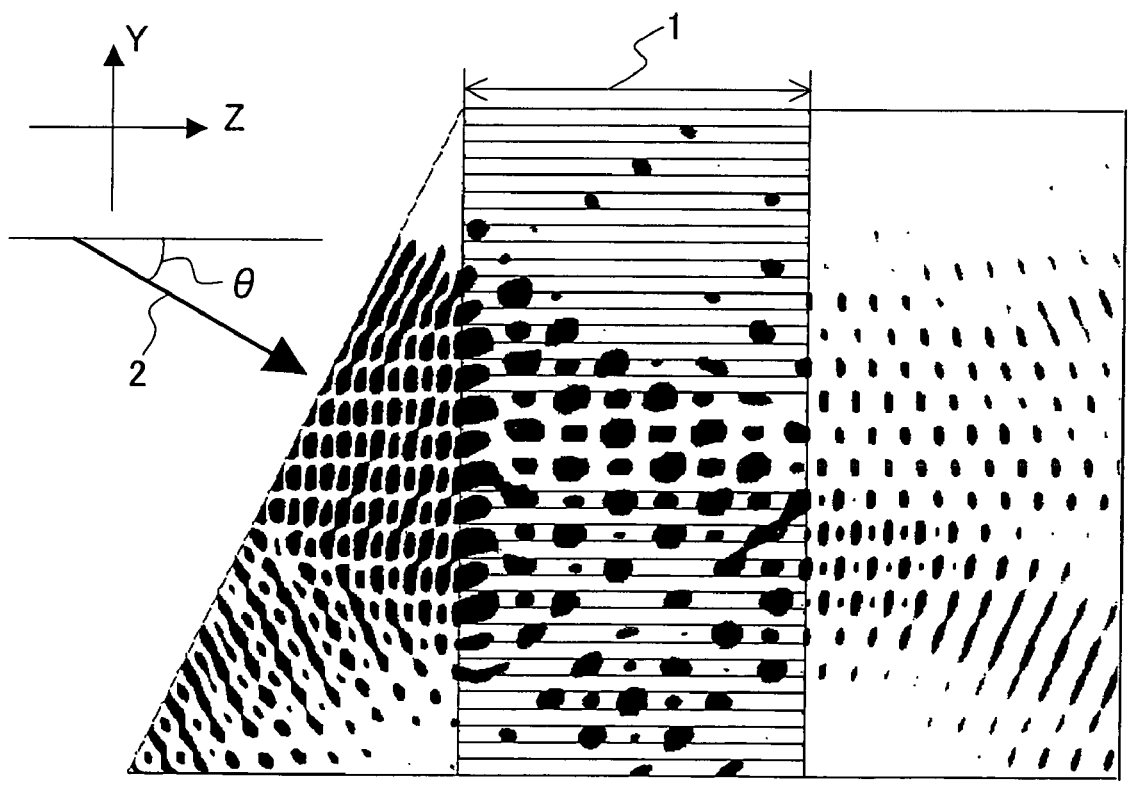
FIG. 17B shows the intensity distribution of the electric field according to the simulation results for Calculation Example 2.

FIG. 17B shows the intensity distribution of the electric field according to the simulation results for Calculation Example 2. In FIG. 17B, the black portions indicate regions where the electric field is strong (crests and troughs of the amplitude). As can be seen from the band diagram (FIG. 9), there is propagation at the Brillouin zone boundary due to the first band only under the conditions of Calculation Example 2, so that with the high refractive index layers as loops and the low refractive index layers as nodes, a pattern of higher-order band propagation appears, in which the phase of the electric field is shifted by half a period between adjacent high refractive index layers. This is an example of the second method (first band propagation through oblique incidence).

It should be noted that since the value of $a/\lambda_0$ is small, the refractive index of the medium at both ends of the photonic crystal 1 is set to the large value of 2.5.

CALCULATION EXAMPLE 3

Calculation Example 1 is explained with reference to FIG. 10.

(1) Structural Conditions of the Photonic Crystal 1

In the photonic crystal 1, the material 5a and the material 5b are layered periodically in alternation (see FIG. 1).

Material 5a: thickness $t_A=0.50$ a; refractive index $n_A=1.4578$

Material 5b: thickness $t_B=0.50$ a; refractive index $n_B=1.00$

At both ends of the photonic crystal 1 was an air layer with a refractive index of n=1.0.

The band diagram for TE-polarized light of the photonic crystal 1 is the same as the one shown in FIG. 16A.

(2) Conditions of the Incident Light Beams 21 and 22

Wavelength in vacuum: $\lambda_0=0.9091$ a ($a/\lambda_0=1.100$)

Polarization: TE polarization (direction of electric field is the X-axis direction)

Incidence angle: $\theta=\pm 27.04°$

That is to say, the following equation is satisfied:

$$n \cdot \sin\theta \cdot (a/\lambda_0)=0.5$$

Thus, the condition of Equation (1) is satisfied. The incident light beams 21 and 22 are incident from two intersecting directions. Also, the loops of the interfering wave coincided with the high refractive index layers. However, the calculation was performed for a finite region, and the width of the incidence portion of the end face 1a of the photonic crystal was set to about 13 periods.

Figure 18:
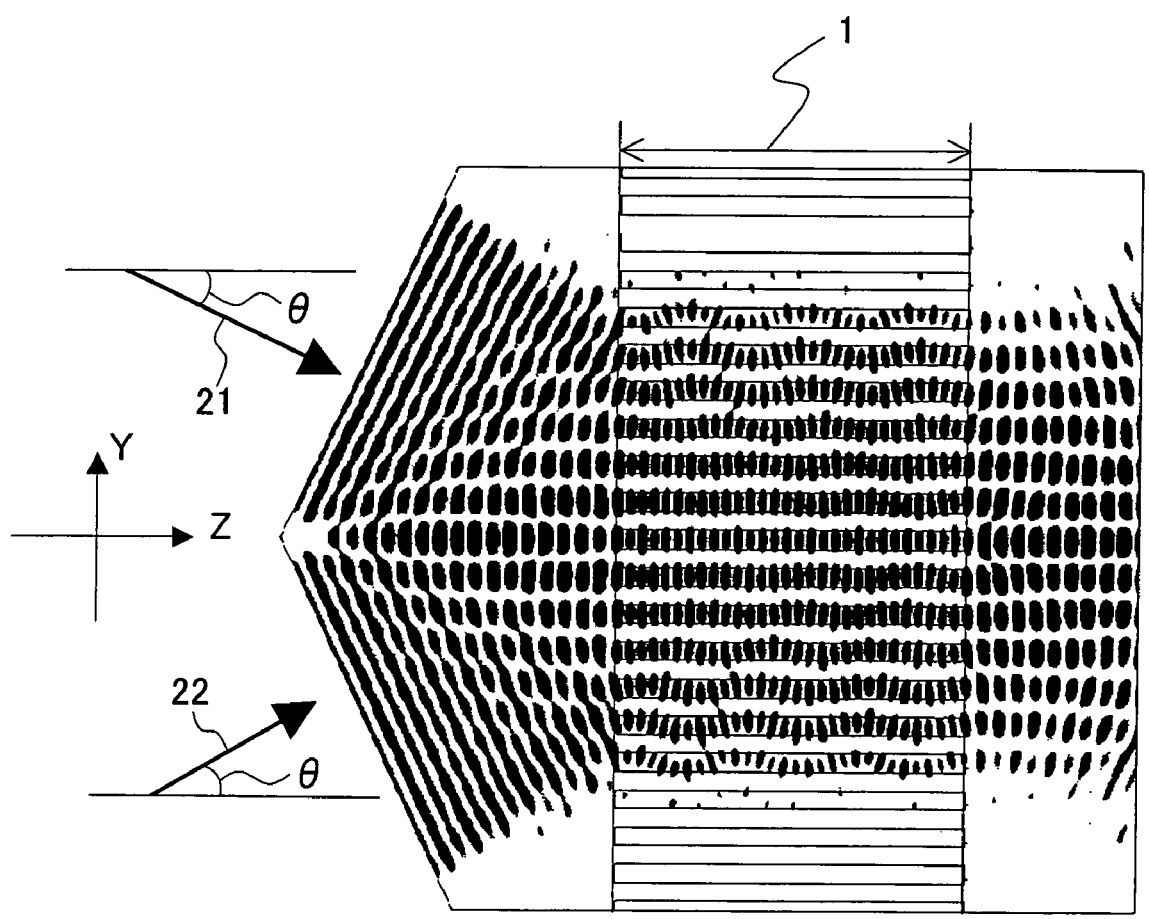
FIG. 18 shows the intensity distribution of the electric field according to the simulation results for Calculation Example 3.

FIG. 18 shows the intensity distribution of the electric field according to the simulation results for Calculation Example 3. In FIG. 18, the black portions indicate regions where the electric field is strong (crests and troughs of the amplitude). This is an example of the third method (phase modulation of incident light through interference of plane waves). As shown in FIG. 18, the photonic crystal 1 has locations in the high refractive index layer, where the electric field exists. Consequently, it can be seen that there is only propagation light due to the first band.

CALCULATION EXAMPLE 4

Calculation Example 4 is explained with reference to FIG. 10. In Calculation Example 4, the conditions are the same as in Calculation Example 3, but the loops of the interference wave are made to coincide with the low refractive index layers.

Figure 19:
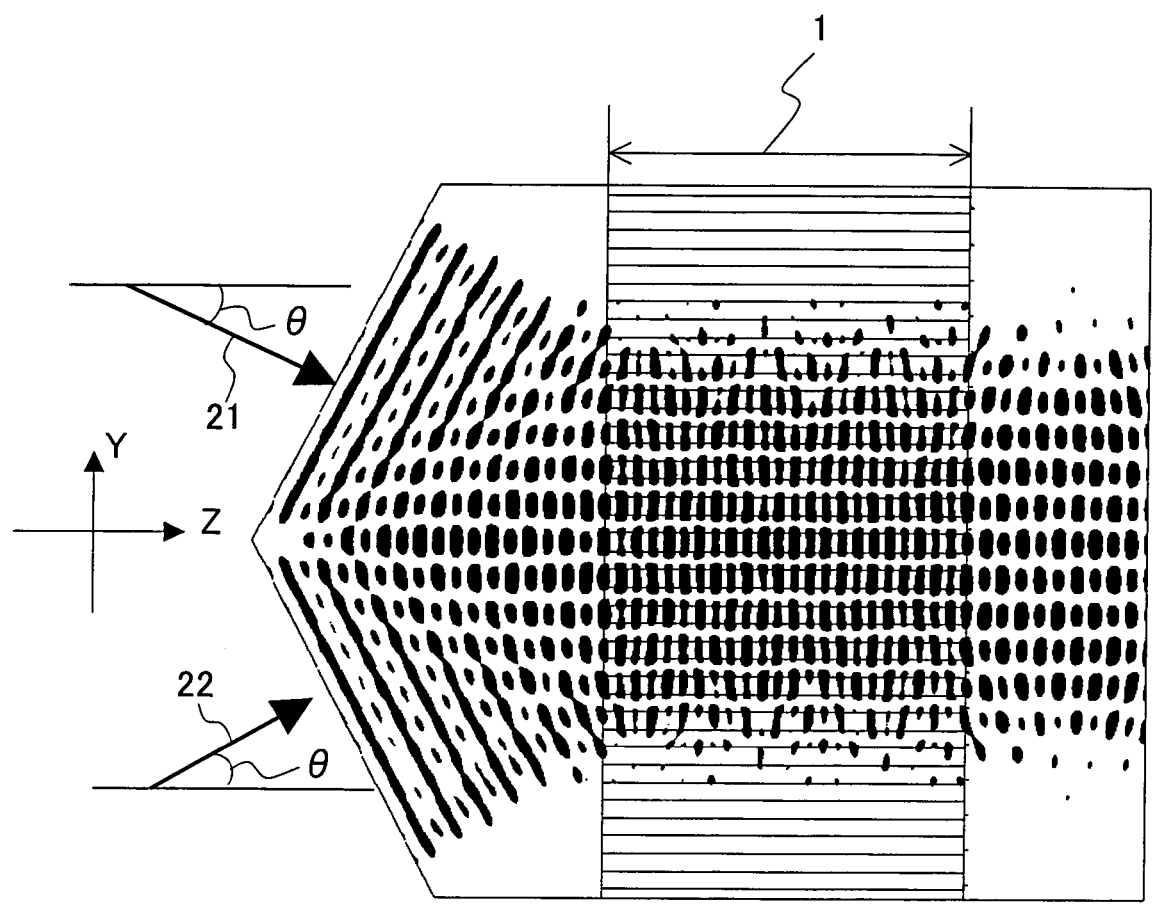
FIG. 19 shows the intensity distribution of the electric field according to the simulation results for Calculation Example 4.

FIG. 19 shows the intensity distribution of the electric field according to the simulation results for Calculation Example 4. In FIG. 19, the black portions indicate regions where the electric field is strong (crests and troughs of the amplitude). This is also an example of the third method (phase modulation of incident light through interference of plane waves). In the photonic crystal 1, the electric field is present locally in the low refractive index layers. Also, it can be seen that only propagation light due to the second band is generated. It should be noted that in Calculation Example 4, the electric field is present locally in the low refractive index layers.

CALCULATION EXAMPLE 5

Calculation Example 5 is explained with reference to FIG. 11.

In this calculation example, phase gratings 6a and 6b are placed at both end faces of the photonic crystal 1, and the plane wave 7 serving as the incident light is incident perpendicularly.

(1) Structural Conditions of the Photonic Crystal 1

In the photonic crystal 1, the material 5a and the material 5b are layered periodically in alternation (see FIG. 1).

Material 5a: thickness $t_A=0.30$ a; refractive index $n_A=2.1011$

Material 5b: thickness $t_B=0.70$ a; refractive index $n_B=1.4578$

The band diagram for TE-polarized light of this photonic crystal 1 is the same as that shown in FIG. 2.

(2) Structure of the Phase Grating 6a and 6b

Figure 20A:
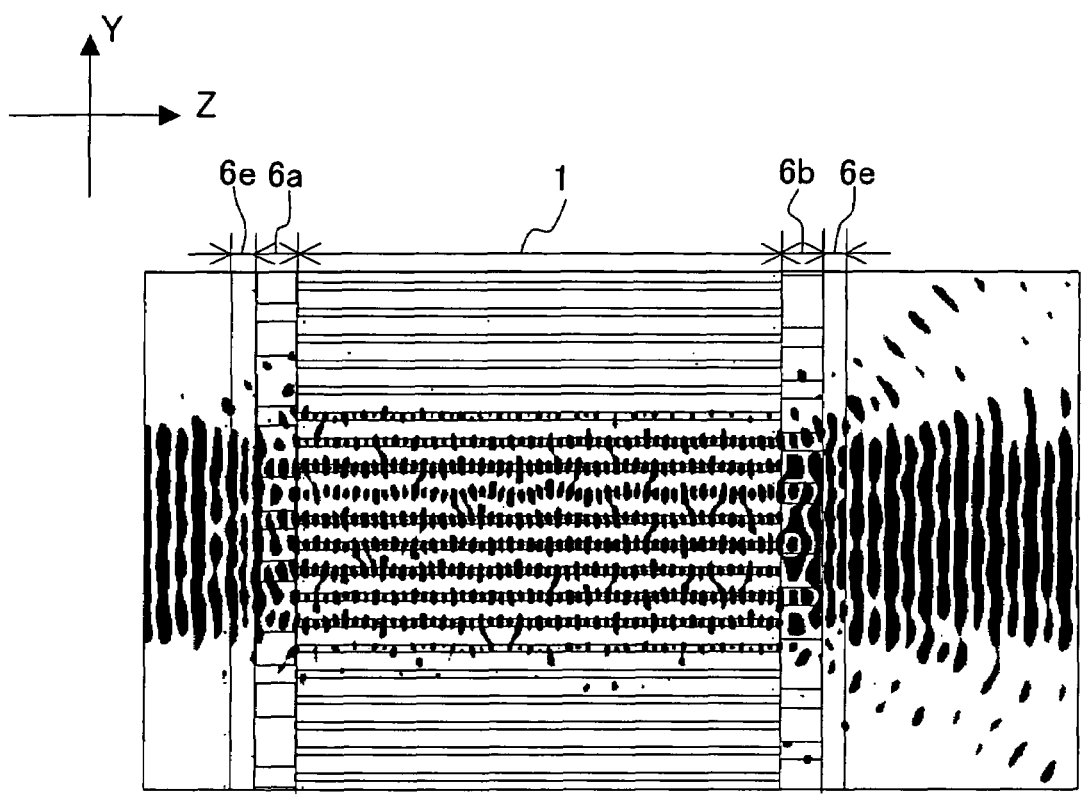
FIG. 20A shows the intensity distribution of the electric field according to the simulation results for Calculation Example 5.
Figure 20B:
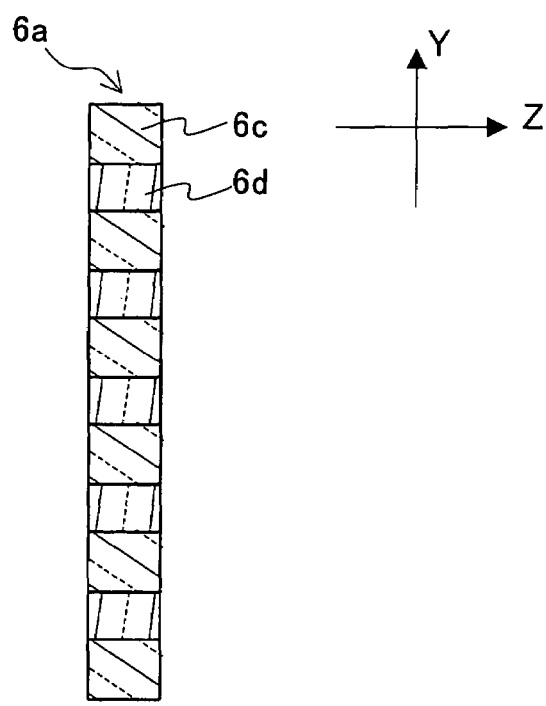
FIG. 20B is a cross-sectional view showing the configuration of a phase grating.

FIG. 20B is a cross-sectional view showing the configuration of the phase grating 6a. The phase grating 6a is a structure in which a material 6c and a material 6d are arranged in rectangular shapes. It should be noted that the phase gratings 6a and 6b in FIG. 11 have a configuration in which either the material 6c or the material 6d is made of air, and the material and the air are layered in alternation. FIG. 20B is a cross-sectional view showing the configuration of the phase grating 6a. As shown in FIG. 20B, the phase grating 6a (phase grating 6b) has a configuration in which the material 6c and the material 6d are layered in alternation. The material 6c has a thickness of $t_C$ in the Y-axis direction and a dielectric constant of $n_C$. The material 6d has a thickness of $t_D$ in the Y-axis direction and a dielectric constant of $n_D$. The configuration of the phase grating 6b is the same as that of the phase grating 6a.

The plane wave 7 serving as the incident light is incident on the phase grating 6a from air through a layer 6e with a dielectric constant of 1.45. Moreover, the emission light 71 from the phase grating 6b also is emitted through a layer 6e with a dielectric constant of 1.45 into air. The thickness in Z-axis direction of this layer 6e is $t_E$.

Material 6c: Y-axis direction thickness $t_C=0.7358$ a; dielectric constant $n_C=1.45$ Material 6d: Y-axis direction thickness $t_D=1.2642$ a; dielectric constant $n_D=1.00$ Period ($t_C+t_D$) of phase grating: $2a$ Thickness $t_Z$ in Z-axis direction of the phase grating: 1.5094 a Spacing $t_E$ between phase grating and air layer (width of layer 6e): 0.9434 a Thus, the shape of the phase gratings 6a and 6b is optimized such that the ±1-order diffraction light becomes strong.

(3) Conditions of the Incident Light (Plane Wave 7)

Wavelength in vacuum: $\lambda_0=1.321$ a ($a/\lambda_0=0.7571$)

Polarization: TE polarization (direction of electric field is the X-axis direction)

(4) Arrangement of the Phase Gratings 6a and 6b

The centers of the materials 6c and 6d serving as the layers of the phase grating 6a on the incident side are arranged such that they coincide with the centers of the high refractive index layers of the photonic crystal 1. The plane wave 7 serving as the incident light is incident from free air with a refractive index of 1.

A phase grating 6b that is the same as the one on the incident side is also placed on the emission side of the photonic crystal 1, and the emission light from the photonic crystal 1 is converted into a plane wave. It should be noted however, that the Y-axis direction position of the phase grating 6b on the emission side is shifted by half the period a with respect to the incident side. This is in order to ensure that the light path length difference in Z-axis direction is constant.

However, the calculation was performed for a finite region, and the width of the incidence portion of the end face 1a of the photonic crystal was set to 9 periods.

The Calculation Example 5 is for the case of the fourth method (phase modulation of incident light through the arrangement of phase gratings). FIG. 20A shows the intensity distribution of the electric field according to the simulation results for Calculation Example 5. In FIG. 20A, the black portions indicate regions where the electric field is strong (crests and troughs of the amplitude). The photonic crystal 1 is arranged such that the high refractive index layers correspond to the loop portions of the propagation light, so that only propagation light due to the first band is generated, as shown in FIG. 20A. Moreover, the propagation light is restored into a plane wave with the phase grating 6b on the emission side.

CALCULATION EXAMPLE 6

Calculation Example 6 is explained with reference to FIG. 13B.

In this calculation example, the value of $a/\lambda_0$ is made very small, and the phase modulation is performed by oblique incidence on a phase grating with a period of 2a, to couple the light into the photonic crystal 1.

(1) Structural Conditions of the Photonic Crystal 1

In the photonic crystal 1, the material 5a and the material 5b are layered periodically in alternation (see FIG. 1).

Material 5a: thickness $t_A$=0.30 a; refractive index $n_A$=2.1011

Material 5b: thickness $t_B$=0.70 a; refractive index $n_B$=1.4578

The band diagram for this photonic crystal 1 is the same as that shown in FIG. 2.

(2) Structural Conditions of the Phase Grating 6a (see FIG. 20B)

The phase grating 6a is a structure in which a material 6c and a material 6d are arranged in rectangular shapes.

Material 6c: Y-axis direction thickness $t_C$=1.6 a; dielectric constant $n_C$=2.00

Material 6d: Y-axis direction thickness $t_D$=0.4 a; dielectric constant $n_D$=1.00

Period ($t_C+t_D$) of phase grating: 2a

Thickness $t_Z$ in Z-axis direction of the phase grating portion: 1.5642 a

Thus, the shape of the phase grating 6a is optimized such that certain diffraction light becomes strong.

(3) Conditions of the Incident Light

Wavelength in vacuum: $\lambda_0$=2.941 a ($a/\lambda_0$=0.340)

Polarization: TE polarization (direction of electric field is the X-axis direction)

Incidence angle: $\theta$=47.332°

That is to say, the following equation is satisfied:

$n \cdot \sin \theta \cdot (a/\lambda_0) = 0.5$

Thus, the condition of Equation (1) is satisfied.

(4) Arrangement of the Phase Grating 6a

Figure 21:
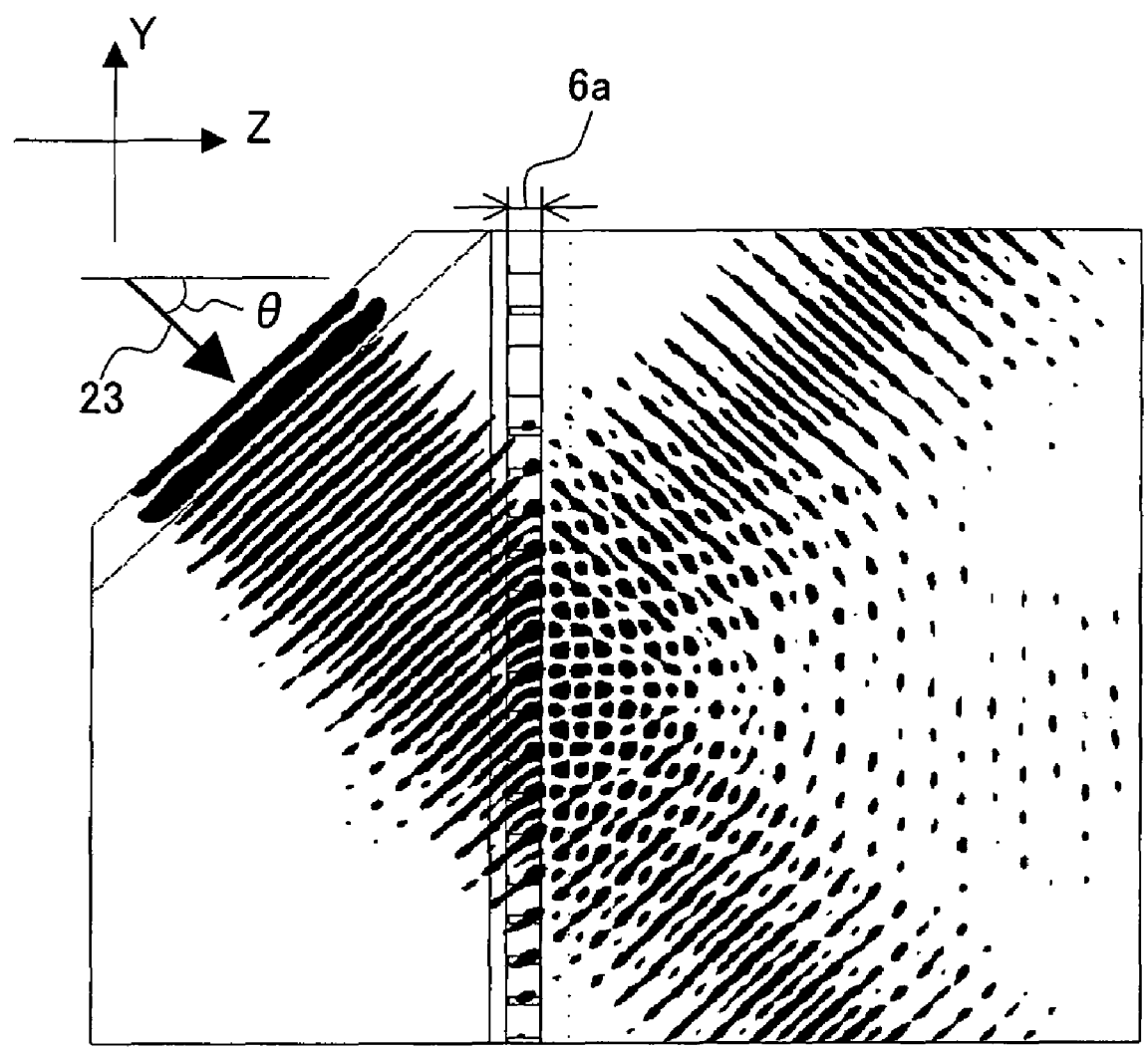
FIG. 21 shows the intensity of the electric field according to a simulation of light that is obliquely incident on a phase grating.

FIG. 21 shows the intensity of the electric field according to a simulation of light that is obliquely incident on the phase grating 6a. In FIG. 21, the black portions indicate regions where the electric field is strong (crests and troughs of the amplitude). FIG. 21 illustrates the refractive indices of the various regions. First, the incident light 23 advances from a region with a refractive index of 1.0 to a region with a refractive index of 2.0, and is incident on the phase grating 6a. From the phase grating 6a, it is emitted from a region with a refractive index of 2.0. As shown in FIG. 21, with light that is incident on the phase grating 6a at an incident angle $\theta$, the interference waves spreading in both directions are strong, and the interference wave advancing perpendicularly with respect to the phase grating 6a is weak, so that a staggered interference pattern is achieved.

FIG. 22 shows the intensity distribution of the electric field according to a simulation result of Calculation Example 6. In FIG. 22, the black portions indicate regions where the electric field is strong (crests and troughs of the amplitude). As shown in FIG. 22, the spacing u between the phase grating 6a and the photonic crystal 1 is set to 0.90909 a, the refractive index at this location is set to 2.0, and the position in the Y-axis direction is adjusted such that the loops of the interference wave correspond to the centers of the high refractive index layers of the photonic crystal 1. It should be noted that the width of the incidence portion of the end face 1a of the photonic crystal 1 is set to about 24 periods.

Calculation Example 6 relates to the case of the sixth method (utilization of interference waves through phase grating with period 2a and oblique incident light). With this method, the value of $a/\lambda_0$ is small, so that the wavelength of the electromagnetic waves propagating through the photonic crystal 1 becomes very long. Moreover, it can be seen that there is a considerable spread in the Y-direction.

CALCULATION EXAMPLE 7

In Calculation Example 7, photonic crystals 11 of different period are provided above and below the photonic crystal 1 of Calculation Example 6, in order to achieve confinement. Calculation Example 7 is explained with reference to FIG. 14B.

(1) Structural Conditions of the Photonic Crystal 1

Other than that the width of the incidence portion of the end face of the photonic crystal 1 is set to about 13 periods, this calculation example is the same as Calculation Example 6.

(2) Structural Conditions of the Photonic Crystal Cladding 11

In the photonic crystal cladding 11, a material of thickness $t_F$ and refractive index $n_F$ is layered in alternation with a material of thickness $t_G$ and refractive index $n_G$, and the structure of the photonic crystal cladding 11 is different than that of the photonic crystal 1. Here, the following parameters are given:

thickness $t_F$=0.2673 a; refractive index $n_F$=2.1011 thickness $t_G$=0.6236 a; refractive index $n_G$=1.4578

The band diagram of the photonic crystal 11 is the same as that shown in FIG. 2. Also, the photonic crystal 11 is set to five periods on top and below, respectively.

(3) Structural conditions of the Phase Grating 6a
    Same as in Calculation Example 6

(4) Conditions of Incident Light 23
    Same as in Calculation Example 6

(5) Placement of the Phase Grating 6a
    Same as in Calculation Example 6

Figure 23:
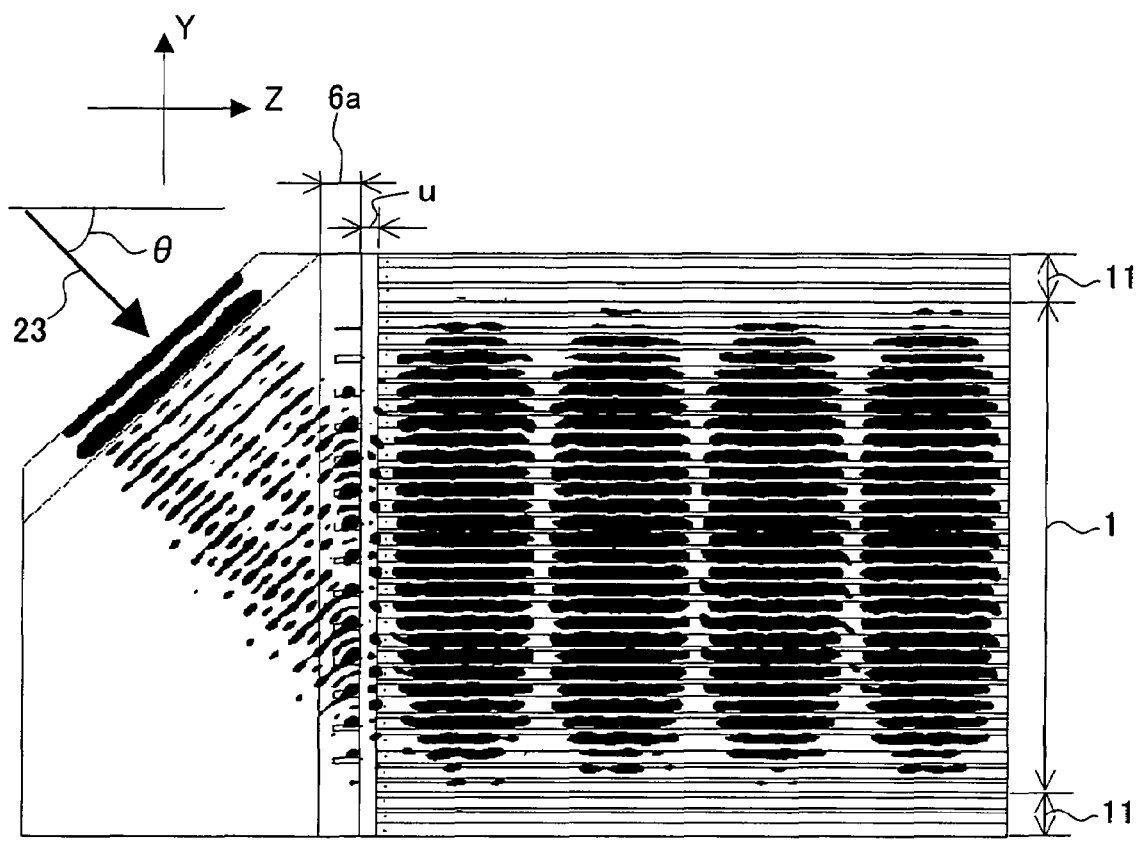
FIG. 23 shows the intensity distribution of the electric field according to a simulation result for Calculation Example 7.

FIG. 23 shows the intensity distribution of the electric field according to the simulation results for Calculation Example 7. In FIG. 23, the black portions indicate regions where the electric field is strong (crests and troughs of the amplitude). As can be seen from FIG. 23, there is hardly any electric field in the photonic crystals 11 serving as the confinement layers, and the electromagnetic wave energy is propagated in the Z-direction while being confined in the Y-axis direction.

CALCULATION EXAMPLE 8

Figure 24A:
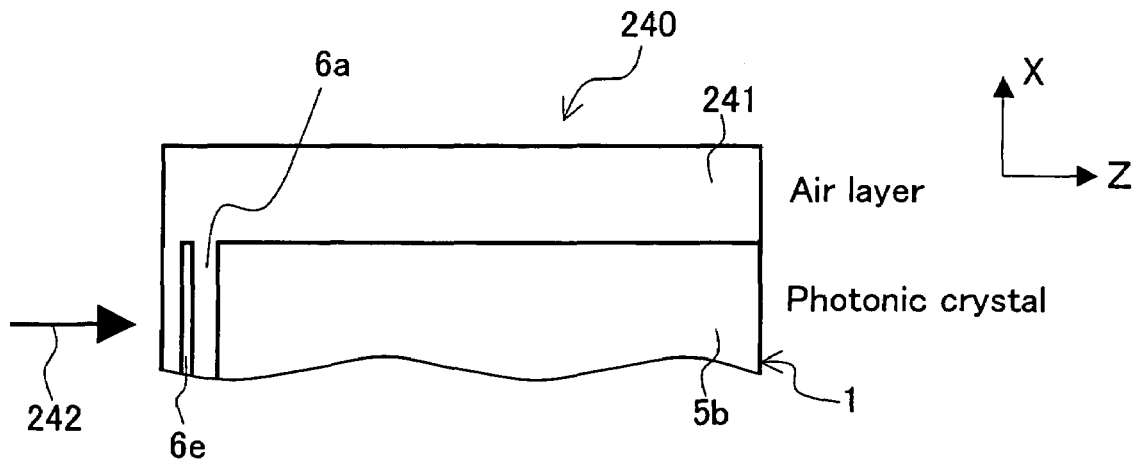
FIG. 24A is a cross-sectional view showing the configuration of a waveguide element used in this Calculation Example 8, taken along the XZ-plane.
Figure 24B:
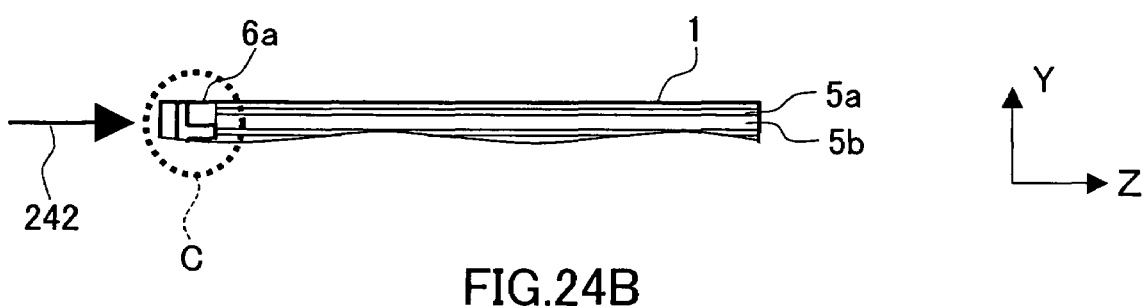
FIG. 24B is a cross-sectional view showing the configuration of a waveguide element used in this Calculation Example 8, taken along the YZ-plane.
Figure 24C:
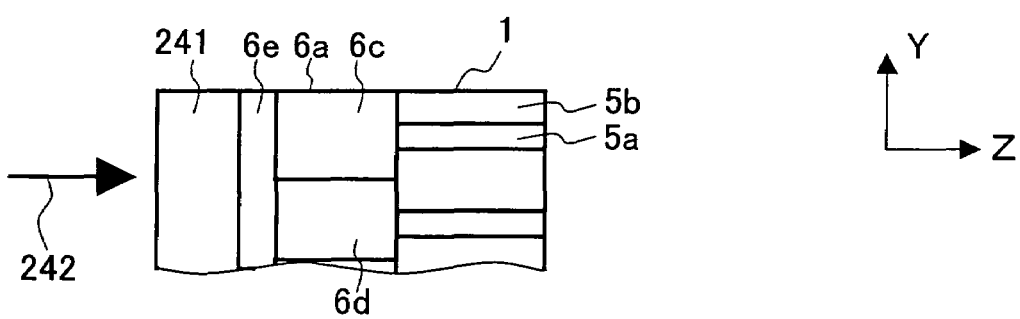
FIG. 24C is a magnified view of a portion of FIG. 24B.

Calculation Example 8 is a calculation example of confinement in the lateral direction (X-axis direction). This calculation example is explained with reference to FIGS. 24A, 24B and 24C. FIG. 24A is a cross-sectional view showing the configuration of a waveguide element 240 used in this Calculation Example 8, taken along the XZ-plane. In FIG. 24A, the photonic crystal 1 has a uniform refractive index in the X- and Y-axis directions. Moreover, FIG. 24A shows only a half plane of the waveguide element 240. Around the photonic crystal 1, there is an air layer 241. The waveguide element 240 is provided with a phase grating 6a on the incident end side. The incident light 242 is incident from air through a layer 6e with a refractive index of 1.45 and through a phase grating 6a onto the photonic crystal 1. FIG. 24B is a cross-sectional view showing the configuration of a waveguide element 240 used in this Calculation Example 8, taken along the YZ-plane. FIG. 24B illustrates only a portion of the waveguide element 240. FIG. 24C is a magnified view of a portion C in FIG. 24B.

(1) Structural Conditions of Photonic Crystal 1

In the photonic crystal 1, the material 5a and the material 5b are layered periodically in alternation (see FIG. 1).

Material 5a: thickness $t_A$=0.30 a; refractive index $n_A$=2.1011

Material 5b: thickness $t_B$=0.70 a; refractive index $n_B$=1.4578

The band diagram for this photonic crystal 1 is the same as that shown in FIG. 2. It should be noted that the design range of the photonic crystal 1 is 2 periods, but the calculation was made for periodic boundary conditions in the Y-axis directions, so that the same results as for an infinitely periodic structure were attained.

(2) Structure of Phase Grating 6a (see FIG. 24C)

The phase grating 6a is a structure in which a material 6c and a material 6d are arranged in rectangular shapes.

Material 6c: Y-axis direction thickness $t_C$=0.7358 a; dielectric constant $n_C$=1.4578

Material 6d: Y-axis direction thickness $t_D$=1.2642 a; dielectric constant $n_D$=1.00

Period ($t_C$+$t_D$) of phase grating: 2a

Thickness $t_Z$ in Z-axis direction of the phase grating portion: 1.5642 a

Spacing $t_E$ of phase grating and air layer (width of layer 6e): 0.4717 a

Thus, the shape of the phase gratings 6a and 6b is optimized such that ±1-order diffraction light becomes strong.

(3) Conditions of the Incident Light 242

Wavelength in vacuum: $\lambda_0$=1.4151 a (a/$\lambda_0$=0.7067)

Polarization: TE polarization (direction of electric field is the X-axis direction)

Incidence angle: vertical incidence (incidence from an air layer 241 with n=1.00)

(4) Structure in X-Axis Direction

The width of the photonic crystal 1 (length in the X-axis direction) was set to 9.434 a, and an air layer with a refractive index of 1.0 was arranged on both sides. In an actual calculation as shown in FIGS. 25A, 25B and 25C, half a region is shown, with a reflection plane in which the photonic crystal 1 is split in the middle with respect to the X-axis direction.

FIGS. 25A, 25B and 25C show the result of a calculation of the electric field intensity distribution by FEM, for the case that incident light 242 is incident. FIG. 25A shows the intensity distribution of the electric field of the cross section in the middle of the waveguide portion, FIG. 25B shows the electric field intensity distribution in the middle of a high refractive index layer, and FIG. 25C shows the electric field intensity distribution in the middle of a low refractive index layer. In FIGS. 25A, 25B and 25C, the black portions indicate regions where the electric field is strong (crests and troughs of the amplitude). It can be seen that the electric field intensity in the air layer around the photonic crystal 1 is substantially zero, and the propagation light is confined within the photonic crystal 1.

As explained above, with the present embodiment, it is possible to realize a waveguide element using higher-order band propagation light within the photonic crystal. Consequently, there are wide applications as an element utilizing an increased effect of dispersion compensation and optical non-linearities caused by group velocity anomalies of the higher-order band propagation light.

INDUSTRIAL APPLICABILITY

It is possible to use a waveguide element using a photonic crystal of the present invention as an electromagnetic control element corresponding to a wide wavelength range.

The invention claimed is:

1. A waveguide element using a photonic crystal having a refractive index periodicity in one direction, the waveguide element comprising:
    an input portion configured for an electromagnetic wave to be obliquely incident on an end face of the photonic crystal, which is substantially parallel to the direction of the refractive index period, and causing propagation light due to a band on a Brillouin zone boundary in a direction not having the refractive index periodicity within the photonic crystal.

2. The waveguide element using a photonic crystal according to claim 1,
    wherein the input portion allows for at least one electromagnetic wave of substantially plane wave shape to be incident to an end face of the photonic crystal, which is substantially parallel to the direction of the refractive index period, the incidence being at an incident angle θ with respect to the end face; and
    wherein the incident angle θ satisfies the relationship $$n \cdot \sin \theta \cdot (a/\lambda_0) = \pm 0.5$$

where n is the refractive index of a medium contacting the end face of the photonic crystal, $\lambda_0$ is the vacuum wavelength of the electromagnetic wave, and a is the photonic crystal's period.

3. The waveguide element using a photonic crystal according to claim 1,
    wherein the input portion comprises:
    an incident-side phase modulation portion that is arranged in close proximity to or in contact with an end face of the photonic crystal, the end face being substantially parallel to the direction of the refractive index periodicity, the incident-side phase modulation portion phase-modulating an electromagnetic wave of substantially plane-wave shape and letting the electromagnetic wave be incident to the end face of the photonic crystal; and
    an incidence portion that allows for the electromagnetic wave to be incident on the incident-side phase modulation portion.

4. The waveguide element using a photonic crystal according to claim 3,
wherein the incident-side phase modulation portion is a phase grating having a refractive index period that has the same direction as the direction of the refractive index period of the photonic crystal, and that is an integer multiple of the refractive index period of the photonic crystal.

5. The waveguide element using a photonic crystal according to claim 3,
wherein the incident-side phase modulation portion is a phase grating having a refractive index period that has the same direction as the direction of the refractive index period of the photonic crystal, and that is twice the refractive index period of the photonic crystal; and
wherein the incidence portion allows for the electromagnetic wave to be incident on the phase grating in a direction that is substantially perpendicular to the direction of the refractive index period of the phase grating.

6. The waveguide element using a photonic crystal according to claim 3,
wherein the incident-side phase modulation portion is a phase grating having a refractive index period that has the same direction as the direction of the refractive index period of the photonic crystal, and that is twice the refractive index period of the photonic crystal;
wherein the incidence portion allows for the electromagnetic wave to be incident on the phase grating in such a manner that the electromagnetic wave is on a plane including the direction of the refractive index period of the phase grating and a direction perpendicular to the direction of the refractive index period of the phase grating, and is incident at an angle θ to the direction perpendicular to the direction of the refractive index period; and
wherein the angle θ satisfies the relationship $n \cdot \sin\theta \cdot (a/\lambda_0) = \pm 0.5$ where n is the refractive index of a medium adjacent to an incidence end face of the phase grating, $\lambda_0$ is the wavelength of the electromagnetic wave in vacuum, and a is the period of the photonic crystal.

7. The waveguide element using a photonic crystal according to claim 3,
wherein the incident-side phase modulation portion is a phase grating having a refractive index period that has the same direction as the direction of the refractive index period of the photonic crystal, and that is the same as the refractive index period of the photonic crystal;
wherein the incidence portion allows for the electromagnetic wave to be incident on the phase grating in such a manner that the electromagnetic wave is on a plane including the direction of the refractive index period of the phase grating and a direction perpendicular to the direction of the refractive index period of the phase grating, and is incident at an angle θ to the direction perpendicular to the direction of the refractive index period; and
wherein the angle θ satisfies the relationship $n \cdot \sin\theta \cdot (a/\lambda_0) = \pm 0.5$ where n is the refractive index of a medium adjacent to an incidence end face of the phase grating, $\lambda_0$ is the wavelength of the electromagnetic wave in vacuum, and a is the period of the photonic crystal.

8. The waveguide element using a photonic crystal according to claim 7,
wherein the incident-side phase modulation portion is formed in one piece with the photonic crystal.

9. The waveguide element using a photonic crystal according to claim 1,
further comprising a confinement portion that confines an electromagnetic wave propagating through the photonic crystal in a direction that is perpendicular to the direction of the refractive index period of the photonic crystal such that said electromagnetic wave propagating through the photonic crystal does not leak in the direction of the refractive index period of the photonic crystal.

10. The waveguide element using a photonic crystal according to claim 9,
wherein the confinement portion is a reflective layer that is arranged on at least one of the side faces of the photonic crystal that are perpendicular to the direction of the refractive index period of the photonic crystal.

11. The waveguide element using a photonic crystal according to claim 9,
wherein the confinement portion is a photonic crystal that is arranged on at least one of the side faces of the photonic crystal that are perpendicular to the direction of the refractive index period of the photonic crystal, and that has a refractive index period in the same direction as the refractive index period of the photonic crystal.

12. The waveguide element using a photonic crystal according to claim 3,
further comprising an emission-side phase modulation portion that is arranged in close proximity or adjacent to an end face that is opposite to the end face of the photonic crystal at which the incident-side phase modulation portion is arranged.

13. The waveguide element using a photonic crystal according to claim 12,
wherein the emission-side phase modulation portion is a phase grating having a refractive index periodicity that has the same direction as the refractive index period of the photonic crystal.

14. The waveguide element using a photonic crystal according to claim 12,
wherein the emission-side phase modulation portion is a phase grating having a refractive index period that has the same direction as the refractive index period of the photonic crystal, and that is the same as the refractive index period of the photonic crystal, the emission-side phase modulation portion being formed in one piece with the photonic crystal.

15. The waveguide element using a photonic crystal according to claim 12,
wherein the emission-side phase modulation portion has the same refractive index period structure as the incident-side phase modulation portion.

16. The waveguide element using a photonic crystal according to claim 15,
wherein the emission-side phase modulation portion is arranged such that the directions of its incident end and emission end are opposite to those of the incident-side phase modulation portion.

17. The waveguide element using a photonic crystal according to claim 1,
wherein the electromagnetic waves propagating through the photonic crystal are waves belonging to either one or both of a lowest-order photonic band and the second photonic band from the low-order side.

* * * * *